(12) United States Patent
Chan et al.

(10) Patent No.: US 7,432,825 B2
(45) Date of Patent: Oct. 7, 2008

(54) INTERROGATION DEVICE AND METHOD FOR SCANNING

(75) Inventors: Vincent K. Chan, Woodbury, MN (US); Ezequiel Mejia, Woodbury, MN (US)

(73) Assignee: Destron Fearing Corporation, South St. Paul, MN (US)

(*) Notice: Subject to any disclaimer, the term of this patent is extended or adjusted under 35 U.S.C. 154(b) by 952 days.

(21) Appl. No.: 10/634,311

(22) Filed: Aug. 4, 2003

(65) Prior Publication Data
US 2004/0036626 A1    Feb. 26, 2004

Related U.S. Application Data

(63) Continuation-in-part of application No. 10/114,875, filed on Apr. 2, 2002, now Pat. No. 7,015,826.

(51) Int. Cl.
*G08C 17/00*    (2006.01)

(52) U.S. Cl. .............................. 340/870.17; 340/10.41; 340/10.42

(58) Field of Classification Search ........................ None
See application file for complete search history.

(56) References Cited

U.S. PATENT DOCUMENTS

| | | | |
|---|---|---|---|
| 3,805,256 A | 4/1974 | Pepin | 340/208 |
| 4,335,371 A | 6/1982 | Connolly, Jr. et al. | 340/347 |
| 4,399,821 A | 8/1983 | Bowers | 340/573.2 |
| 5,235,326 A | 8/1993 | Beigel et al. | 340/825.54 |
| 5,252,962 A | 10/1993 | Urbas et al. | 340/870.17 |
| 5,481,262 A | 1/1996 | Urbas et al. | 340/870.17 |
| 5,566,022 A | 10/1996 | Segev | 359/172 |
| 5,638,418 A | 6/1997 | Douglass et al. | 377/25 |
| 5,669,713 A | 9/1997 | Schwartz et al. | 374/1 |
| 5,712,609 A | 1/1998 | Mehregany et al. | 337/70 |
| 5,724,030 A | 3/1998 | Urbas et al. | 340/870.17 |
| 5,764,541 A | 6/1998 | Hermann et al. | 364/571.01 |
| 5,767,792 A | 6/1998 | Urbas et al. | 340/870.17 |
| 5,822,225 A | 10/1998 | Quaderer et al. | 364/571.01 |
| 5,833,603 A | 11/1998 | Kovacs et al. | 600/317 |
| 5,887,176 A * | 3/1999 | Griffith et al. | 713/320 |
| 5,952,935 A | 9/1999 | Mejia et al. | 340/825.54 |
| 6,054,935 A | 4/2000 | Urbas et al. | 340/870.17 |
| 6,061,614 A * | 5/2000 | Carrender et al. | 701/33 |
| 6,115,441 A | 9/2000 | Douglass et al. | 377/25 |
| 6,147,606 A | 11/2000 | Duan | 340/572.7 |
| 6,149,299 A | 11/2000 | Aslan et al. | 374/178 |

(Continued)

OTHER PUBLICATIONS

Liptak, "Temperature Measurement", pp. 6-19, Jun. 1993.

(Continued)

*Primary Examiner*—Brian Zimmerman
*Assistant Examiner*—Hung Q Dang
(74) *Attorney, Agent, or Firm*—Sheridan Ross P.C.

(57) ABSTRACT

A radio frequency identification system includes an interrogator for generating and transmitting an interrogation signal to a transponder. One or more transponders of the system receive the interrogation signal and return a data signal which includes identification and/or body characteristic information in one of multiple formats. The interrogator receives the data signal, determines the format of the data signal, and decodes the data signal to obtain the identification and/or body characteristic information. The interrogator operates to decode data signals from transponders not capable of transmitting body characteristic information and transponders which are capable of transmitting body characteristic information.

8 Claims, 17 Drawing Sheets

U.S. PATENT DOCUMENTS

| | | | |
|---|---|---|---|
| 6,226,324 B1 | 5/2001 | Allstrom | 375/238 |
| 6,332,710 B1 | 12/2001 | Aslan et al. | 374/183 |
| 6,369,712 B2 | 4/2002 | Letkomiller et al. | 340/572.1 |
| 6,377,110 B1 | 4/2002 | Cooper | 327/513 |
| 6,400,261 B1 | 6/2002 | Starkey et al. | 340/442 |
| 6,483,065 B1 | 11/2002 | Milanesi et al. | 340/572.1 |
| 6,512,520 B1 | 1/2003 | Naka et al. | 345/473 |
| 6,543,279 B1 | 4/2003 | Yones et al. | 73/146.3 |
| 6,791,457 B2 * | 9/2004 | Shimura | 340/448 |
| 6,865,164 B1 * | 3/2005 | Scribano et al. | 370/328 |
| 2002/0095980 A1 * | 7/2002 | Breed et al. | 73/146 |

OTHER PUBLICATIONS

Bowman et al., "A Low Noise, High Resolution Silicon Temeperature Sensor", pp. 1308-1313, *IEEE Journal of Solid-State Circuits*, vol. 31, No. 9, Sep. 1996.

Huijsing et al., "Micropower CMOS Temperature Sensor With Digital Output", pp. 933-937, *IEEE Journal of Solid-State Circuits*, vol. 31, No. 7, Jul. 1996.

Fraden, "Handbook of Modern Sensors: Physics, Designs, and Applications (Second Edition)"; *Springer-Verlag New York, Inc.*; 1996, pp. 483-487.

PCT Serial No. PCT/US03/07985 International Search Report dated Jul. 29, 2004.

* cited by examiner

INTERROGATION DEVICE AND METHOD FOR SCANNING

CROSS-REFERENCE TO RELATED APPLICATIONS

This Application is a Continuation-in-Part of U.S. patent application Ser. No. 10/114,875 Entitled "METHOD AND APPARATUS FOR SENSING AND TRANSMITTING A BODY CHARACTERISTIC OF A HOST" filed on Apr. 2, 2002 now U.S. Pat. No. 7,015,826.

FIELD OF THE INVENTION

The present invention relates to radio frequency identification (RFID) systems and, more particularly, to interrogators for use with such systems capable of determining identification and/or other information from a tag.

BACKGROUND OF THE INVENTION

Transponders and scanner systems are well known in the art. These systems generally include a scanner, or interrogator, which transmits signals to, and receives signals from, one or more transponders, or tags. The transponders may be active, in that they contain a power source such as a battery, or passive in that they receive power from an external source, such as through inductive coupling as can be the case with radio frequency technology. Passive transponders are commonly implanted in animals due to the fact that they do not rely on a self-contained power source. Such implantable, passive transponders often contain identification information for the animal. It is also known to have an implantable transponder coupled with a sensor, such as a temperature measurement device, such that the transponder is able to transmit both identification information, as well as information on the body characteristic of the animal.

The temperature measurement devices used in conjunction with these transponders have traditionally been thermistors. The resistance of the thermistor changes as a function of the temperature of the thermistor. Thus, using a properly calibrated thermistor, the temperature of the animal can be determined, and transmitted by the transponder. Typically, the transponder includes a circuit which is connected to the thermistor and measures the resistance of the thermistor by supplying a known current, and measuring the voltage across the thermistor. The voltage is then measured and a temperature value derived from the voltage measurement correlated to the known resistance characteristics of the thermistor.

As will be understood, because an implantable transponder is a passive device, it is highly desirable to have the implantable transponder consume little power. However, traditional thermistor based temperature sensors increase power consumption by requiring a predetermined current be supplied to the thermistor. This additional current increases the power consumption of the transponder significantly. Accordingly, it would be advantageous to have an implantable transponder capable of transmitting temperature information, and which also consumes less power than thermistor transponders which are capable of transmitting temperature information.

Generally, the manufacture and assembly of a temperature sensing transponder requires additional resources compared to the manufacture and assembly of a typical identification transponder. Assembly of a temperature sensing transponder is generally done after the components comprising the identification subassembly of the transponder and the components comprising the temperature sensor or thermistor have been manufactured and/or assembled. The two manufactured subassemblies or components are then combined in a separate manufacturing step. This separate manufacturing step can take a significant amount of time and resources, ultimately increasing the cost of such a transponder. As will be understood, it is advantageous to have such a transponder which is relatively inexpensive, and thus more affordable for a user who wishes to purchase the device. Accordingly, it would be advantageous to have a temperature sensor which is integrated within the normal identification components, thus reducing the costs of such a transponder by not requiring the additional components or the additional step of assembling the transponder with a separate temperature sensor.

While traditional transponders with associated temperature sensing have been somewhat successful in the past, there are several disadvantages associated with them. For example, each thermistor is required to be calibrated, in order to ensure that an accurate temperature is delivered to a user. Such a calibration is performed following the full assembly of the transponder. The assembled transponder is generally placed in a liquid bath having a known temperature. An initial temperature reading is determined using the transponder. This initial temperature reading is compared to the known temperature of the bath, and a compensation factor is determined for the transponder. This compensation factor is typically stored in a memory location within the transponder, and sent to the scanner together with the sensed temperature information requiring the scanner to perform a calculation to determine the temperature of the animal.

In addition, the calibration process is very labor intensive, further adding to the ultimate cost of such a temperature sensing transponder. Each transponder is individually calibrated because each transponder must be assembled with a temperature sensor prior to any calibration. As transponders are typically mass produced in large quantities, individual calibration can add a significant expense to the cost to manufacture such a transponder. Therefore, it would be advantageous to perform a temperature calibration in a more efficient manner, such as prior to the assembly of the transponder.

Furthermore, traditional transponders having associated temperature sensors typically transmit identification information and temperature information in a unique transmission format. For example, different manufacturers employ unique communication schemes which require particular interrogators to be able to read their transponders. Thus, one manufacturer's transmission format may not be able to be read by scanners which were not specifically designed to read such information, i.e., a competitor's scanner. This can be disadvantageous because, in the event that an animal having such a transponder becomes lost or stolen, the transponder can be used as a means of identification for the animal. However, if a scanner is used to attempt to scan a transponder and does not recognize the unique format for its identification information, the scanner will be unable to determine the identification information which is stored in the transponder. Thus, it would also be advantageous to have a temperature sensing transponder which is able to transmit identification information in a format which is able to be read by most common scanners.

Similarly, interrogators in systems which employ temperature sensing transponders are commonly designed to read transponder information in a predetermined telegram structure. If a transponder transmits additional information in addition to, or instead of, identification information, the interrogator typically has to be specifically programmed to read the information in that telegram structure. Such interrogators generally are not able to read other types of transponders which do not include additional information in the telegram structure. Accordingly, it would be beneficial to have an interrogator which is able to read transponders which may or may not include identification and additional information transmitted from the transponder to the interrogator.

Likewise, transponders may transmit information to interrogators in differing formats such as, for example, ISO Standard 11785, which contains two distinct transmission protocols. Traditionally, interrogators have been capable of reading transponders which transmit information in both transmission protocols. However, systems containing transponders which contain additional information, such as temperature information, in addition to, or instead of, identification information traditionally require an interrogator which is specifically designed and programmed to receive this information. Therefore, it would be beneficial to have an interrogator which is capable of determining information received from a transponder which may or may not include identification and other information. Furthermore, if a transponder does transmit additional information to the interrogator, it would be beneficial to have an interrogator which could be relatively easily modified to determine such information.

SUMMARY OF THE INVENTION

The present invention solves the aforementioned problems and meets the aforementioned, and other, needs. In accordance with the present invention, an interrogation device and method for interrogating a transponder are provided. The interrogation device and method for interrogating a transponder allow for the interrogation and collection of information from transponders capable of communicating identification information and/or body characteristic information. The interrogation device and method for interrogating also allow for collection of information from transponders communicating using multiple formats and multiple communication protocols.

One aspect of the present invention provides an interrogation apparatus for reading a transponder having an antenna portion operable to transmit an interrogation signal to the transponder and to receive a data signal from the transponder; a processing portion operably interconnected to the antenna portion operable to receive the data signal, determine a data format of the data signal, determine the presence or absence of body characteristic data within the data signal, and when the presence of body characteristic information is detected, decode the data signal to obtain the body characteristic information; and an output portion operable to output, when the presence of body characteristic information is detected, the body characteristic information. The processing portion may further be operable to determine the presence of absence of identification information within the data signal, and when the presence of identification information is detected, decode the data signal to obtain the identification information. The output portion is also operable to output the identification information when the presence of identification information is detected.

In an embodiment, processing portion is operable to detect at least two different formats of data within the data signal and operable to detect the presence or absence of temperature information, or other body characteristic information, within each format of data. The data format may conform to an existing standard for transmission of identification information from a transponder to an interrogator, such as ISO standard 11785. The data formats which the interrogation apparatus may detect and receive may include FDXA format transmissions, and FDXB format transmissions.

The interrogation apparatus, in one embodiment, has an output portion containing a display which is operable to display information received from a transponder to a user. The output portion may also include a connection to an external storage medium, which may store information received from one or more transponders.

Another aspect of the present invention provides a system for identifying an object and a characteristic associated therewith, comprising an interrogator operable to transmit an interrogation signal and receive a data signal; and a transponder operable to receive the interrogation signal and generate the data signal. The data signal includes identification information and/or characteristic information associated with the object. The interrogator is further operable to determine a format of the data signal, determine the presence or absence of characteristic information, determine the presence or absence of identification information, and output the identification information and/or characteristic information.

In another aspect of the present invention, a method for identifying an object and a characteristic associated therewith is provided, the method including the steps of: transmitting an interrogation signal from an interrogator; detecting the interrogation signal at a transponder; transmitting an encoded data signal including at least one of identification information and characteristic information from the transponder to the interrogator; receiving the encoded data signal at the interrogator; determining a format of the data signal; decoding the data signal to determine the presence of absence of identification information and the presence or absence of characteristic information; and outputting the identification information and/or characteristic information.

In yet another aspect, the present invention provides a method for interrogating a transponder, comprising the steps of: transmitting an interrogation signal; detecting a response signal generated from the transponder in response to the interrogation signal; determining a format of the response signal; decoding identification information encoded within the response signal; determining if characteristic data is included in the response signal; and, when characteristic data is included in the response signal, decoding the characteristic data. The characteristic data may include temperature information. In one embodiment, the determining a format step includes storing a predetermined number of telegrams from the response signal, and analyzing the telegrams to determine a format of the response signal.

A reader for reading body characteristic information transmitted by a transponder is provided in another aspect of the present invention. The reader includes a receiver operable to receive a data signal from the transponder; a processor operable to decode the data signal, determine a format of the data signal, determine the presence of body characteristic information in the data signal, and when body characteristic information is present, output the body characteristic information. The processor, in one embodiment, is also operable to determines the presence of identification information in the data signal and, when identification information is present, output the identification information. In one embodiment, the reader also includes a display portion operable to display body characteristic and/or identification information which is output from the processor.

Additional features and other embodiments of the present invention will become apparent from the following discussion, particularly when taken together with the accompanying drawings.

DETAILED DESCRIPTION

Figure 1:
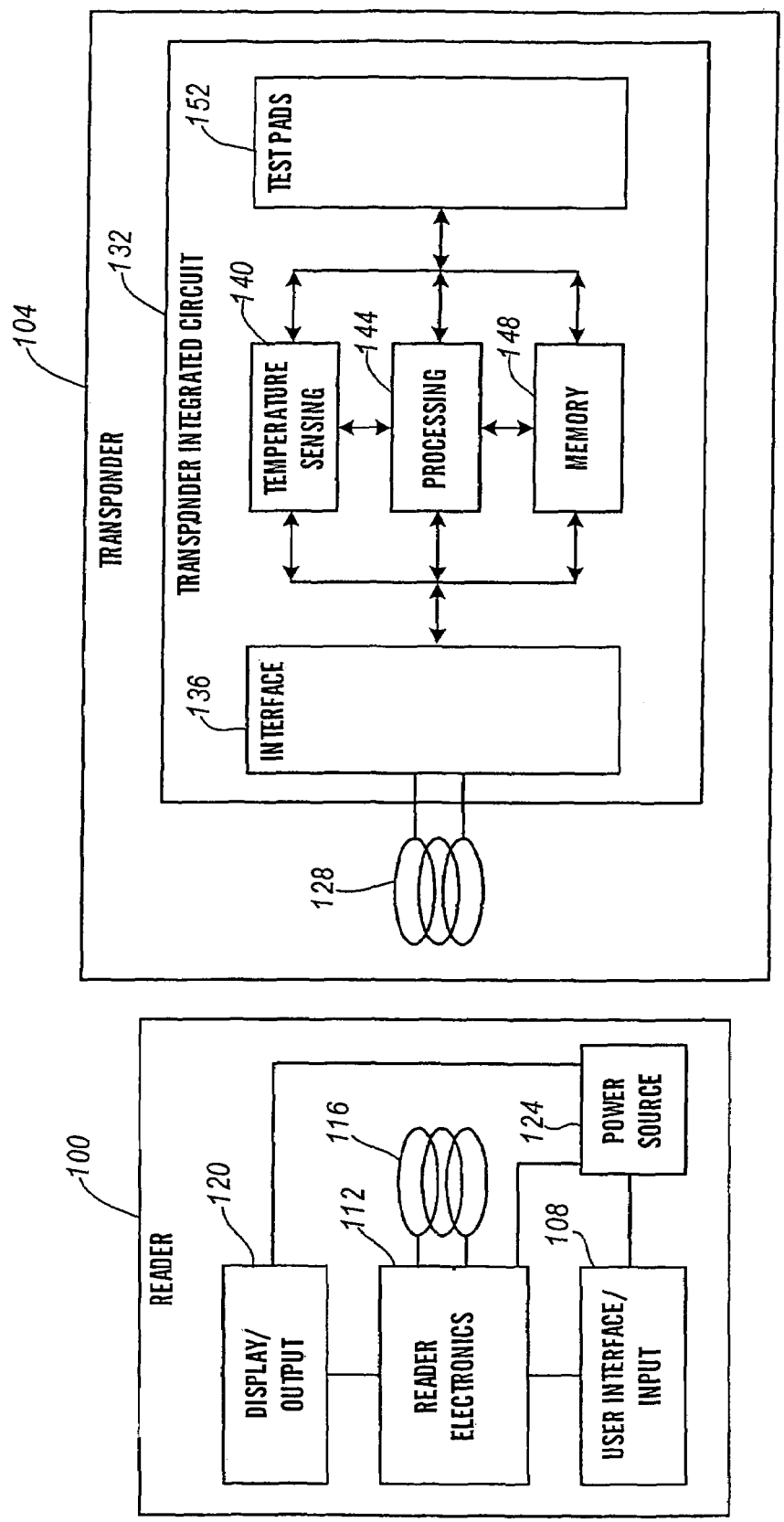
FIG. 1 is a block diagram illustration of a temperature sensing system, including a transponder and an interrogator, of one embodiment of the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Referring to FIG. 1, a block diagram representation of a transponder system including a reader 100 and temperature sensing transponder 104 of one embodiment of the present invention is illustrated. The reader 100 is similar to traditional readers associated with passive transponder devices, and includes a user interface/input 108, reader electronics 112, a reader antenna 116, a display/output 120, and a power source 124. The reader 100 is operable to transmit and receive information over the reader antenna 116. Instead of a single antenna 116, the reader could have separate transmit and receive antennas, including multiple receive antennas permitting differential detection techniques which are well known in the art. The reader electronics 112 are operable to initiate a signal transmission over the reader antenna 116, and read a response signal which is received at the reader antenna 116. The response signal contains encoded information, as will be described in more detail below. The reader electronics 112 demodulate the response signal and read the encoded information. The display/output 120 may be used to display information contained in the response signal to a user, or output the information to an external device, such as an external display, printer, computer system, communication devices or storage device. The user interface/input 108 may include a simple pushbutton interface on a reader 100, which a user may depress to initiate an interrogation from the reader 100. The user interface/input 108 may also include more sophisticated keypad type interface, or a connection to an external device, such as a computer system or communication device. The reader 100 also includes a power source 124, which supplies power to the reader 100 and associated components. The power source 124 may be internal batteries which are installed in the reader 100. The power source may also have a connection to an external AC or DC source of power in addition to, or instead of, batteries.

The transponder 104 includes an antenna coil 128, and a transponder integrated circuit 132. The antenna coil 128 carries out both receive and transmit functions such as those traditionally associated with implantable transponders, and are well known in the art. While a single antenna coil 128 is illustrated, the transponder 104 could have separate transmit and receive antenna coils. An interrogation signal from the reader 100 is received at the antenna coil 128, and communicated to the transponder integrated circuit 132. The transponder integrated circuit 132 includes an interface portion 136, a temperature sensing portion 140, a processing portion 144, a memory portion 148, and a set of test pads 152. The transponder integrated circuit 132, upon receiving the interrogation signal, determines the temperature of the transponder 104 using the temperature sensing portion 140, and retrieves identification information from the memory portion 148. The transponder integrated circuit 132 then transmits identification and temperature information over the antenna coil 128 through the interface portion 136. The processing portion 144 processes information and communicates with different portions of the transponder integrated circuit 132. The test pads 152 link input signals to the processing portion and the memory portion during the initial circuit testing, temperature calibrating and identification programming processes, as will be described in further detail below. The determination of the temperature and identification information, as well as the format which is used for the transmitting of the identification and temperature information will be described in more detail in the discussion of FIGS. 2 through 15.

Figure 2:
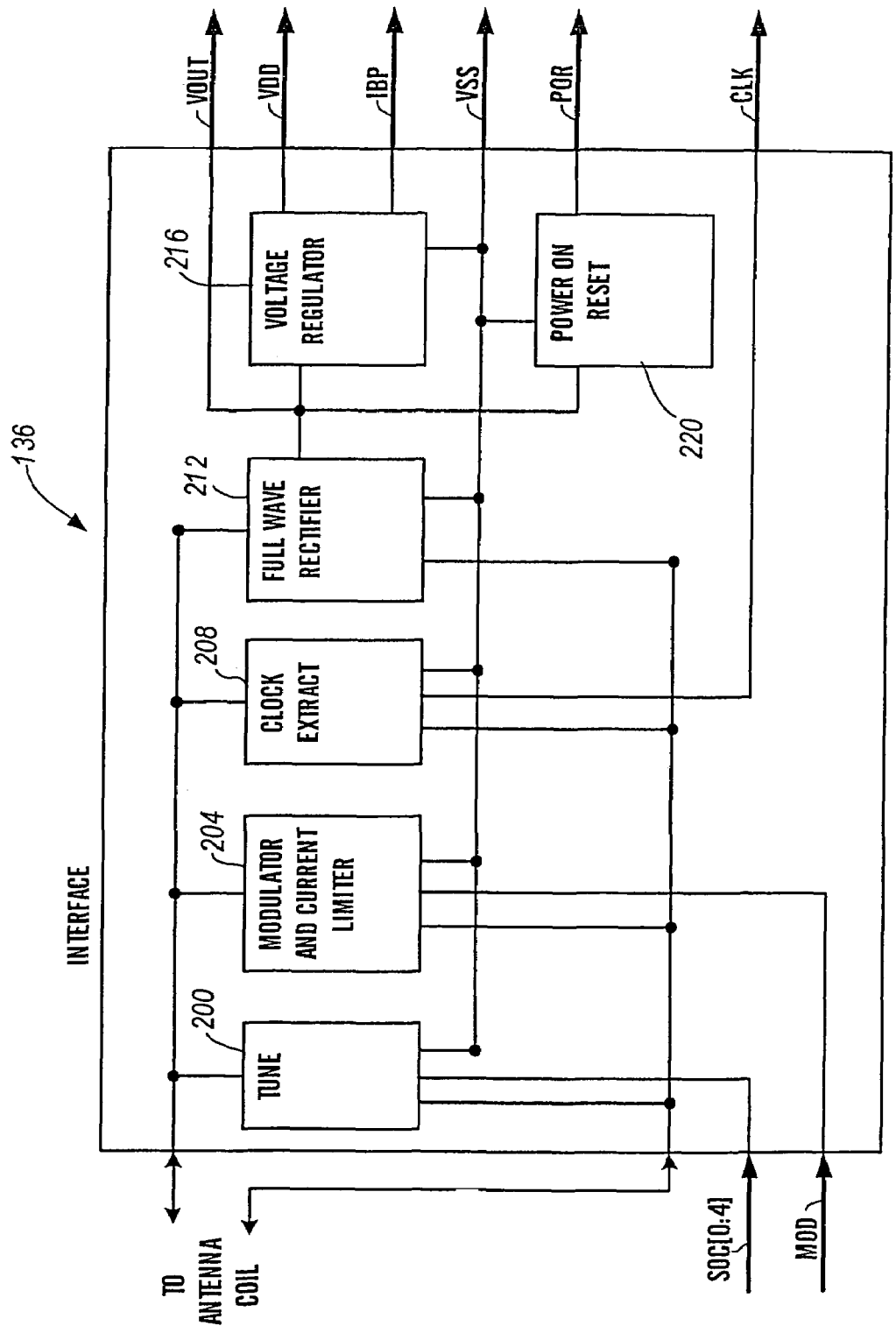
FIG. 2 is a block diagram illustration of interface circuitry for a temperature sensing transponder of an embodiment of the present invention.

Referring now to FIG. 2, a block diagram illustration of the interface portion 136 is now described. The interface portion 136 includes a tune circuit 200, a modulator and current limiter circuit 204, a clock extract circuit 208, a full wave rectifier circuit 212, a voltage regulator circuit 216, and a power on reset circuit 220. The tune circuit 200 receives an input signal SOC[0:4] from the memory portion 148 and trims the capacitance of the antenna so as to tune the antenna coil 128 to its optimal efficiency. The tune circuit 200, and its calibration, will be described in more detail below. The modulator and current limiter circuit 204 receives an input signal MOD from the processing portion 144 and modulates the information onto a carrier signal to create the response signal which is transmitted to the reader 100 through the antenna coil 128. In addition to modulating the information received from the processing portion 144, the modulator and current limiter circuit 204 limits the current that may enter the processing portion 144, temperature sensing portion 140, and memory portion 148, in order to help protect the transponder integrated circuit 140 from damage which may result from high current.

The clock extract circuit 208 receives the interrogation signal, and produces a clock signal CLK which is used as a clock for those components within the transponder integrated circuit 104 which require a clock. The clock extract circuit 208 uses the interrogation signal to generate the clock signal CLK by dividing the frequency of the interrogation signal by a predetermined amount to generate a system clock. The full wave rectifier circuit 212 rectifies the received interrogation signal, and produces a direct current (DC) power supply VOUT. The DC power supply VOUT is then connected to the voltage regulator circuit 216, power on reset circuit 220, and the memory portion 148. The voltage regulator 216 regulates the DC power supply VOUT signal to provide a regulated output signal VDD and VSS to power other components within the transponder integrated circuit 104. The voltage regulator circuit 216 also provides a DC bias current IBP which is used in a sense amplifier located within the memory portion 148. The power on reset circuit 220 outputs a signal POR when the input signal VOUT reaches a predetermined threshold level. This is used to ensure that enough power is obtained to operate the transponder properly and to verify that all of the components start operation from a known state.

Figure 3:
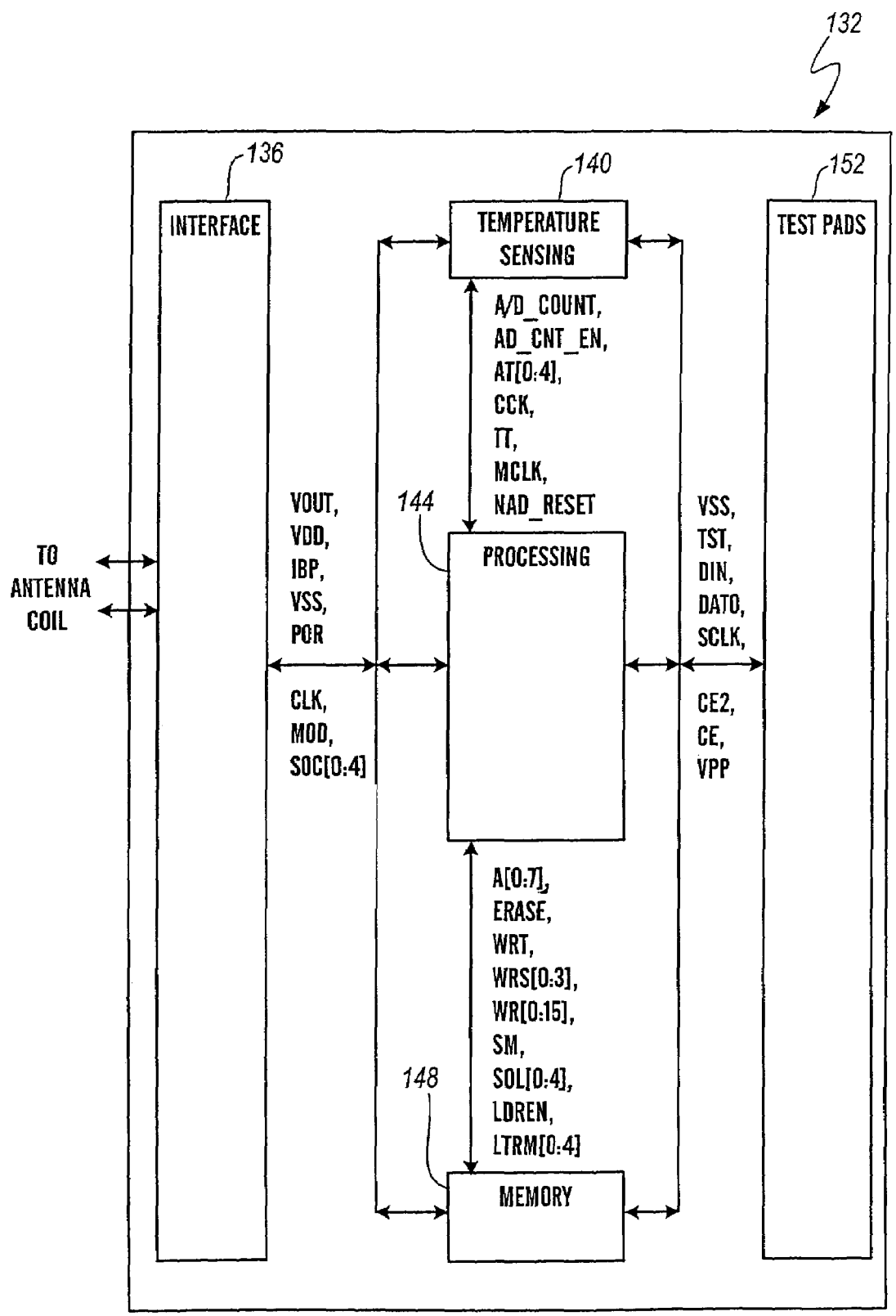
FIG. 3 is a block diagram illustration indicating major signals communicated between components of a temperature sensing transponder of an embodiment of the present invention.

Referring now to the block diagram illustration of FIG. 3, the major signals communicated between different portions of the transponder integrated circuit are now described. The major signals communicated between the interface portion 136 and remaining portions of the integrated circuit include VOUT, VDD, IBP, VSS, POR, CLK, MOD and SOC[0:4], as were described with reference to FIG. 2.

The major signals communicated between the temperature sensing portion 140 and processing portion 144 include A/D_COUNT, AD_CNT_EN, AT[0:4], CCK, TT, MCLK and NAD_RESET. A/D_COUNT is a digital value representing temperature-proportional analog current which is generated by a temperature sensor within the temperature sensing portion 140. The temperature sensor and the A/D converter will be described in more detail below with reference to FIG. 4 and FIG. 5. AD_CNT_EN is the A/D converter enable signal. When the AD_CNT_EN signal is high, the A/D converter is selected to convert temperature into a digital value A/D_COUNT. AT[0:4] is an analog temperature trim value used to trim the analog current portion of the temperature sensor circuitry. The value is determined during the temperature calibration process, which will be described in further detail in FIG. 9. CCK is the clock used by the A/D converter in the temperature sensing circuit. TT is the signal used to indicate transmission of temperature data. Temperature data is transmitted when TT is high. MCLK is the clock used by the A/D converter and it is equal to CLK/2. NAD_RESET is the active low A/D reset signal and is used to reset the A/D converter before a conversion.

The major signals communicated between processing portion 144 and memory portion 148 include A[0:7], ERASE, WRT, WRS[0:3], WR[0:15], SM, SOL[0:4], LDREN and LTRM[0:4]. A[0:7] is an 8-bit address bus for accessing the memory portion 144. ERASE is the signal for erasing the memory, and the memory is erased when ERASE is high. WRT is the signal for writing into the memory, and the memory may be written to when WRT is high. WRS[0:3] are write select bits used to select the row of memory to write when used in combination of active high WRT. WR[0:15] are digital test register bits. SM is the single memory bit output from the memory. SOL[0:4] are raw bits from the memory that indicate antenna tune trim values. LDREN is logic drive enable. When LDREN is high, the antenna tune trim bits from the digital test register are output from the memory. LTRM[0:4] are logic trim bits used to drive antenna tune selection when LDREN is high.

The major signals communicated between test pads 152 and processing portion 144 and memory portion 148 include VSS, TST, DIN, DATO, SCLK, CE2, CE, VPP. VSS is a ground signal. TST is an input signal used to decode the control register into meaningful codes. The rising edge of TST is used to generate a global reset on the chip to synchronize modulation output with CLK. SCLK is the serial clock signal used to shift in input data (DIN) or shift out output data (DATO) for the processing portion 144. DIN is the input data used in combination with SCLK to select test modes as well as program the memory portion 148. DATO is the output data used in combination with SCLK to shift out digital test register bits. CE2 is a chip enable signal for the processing portion 144, which is used to activate a test mode. CE is the chip enable signal for the memory portion 148, which is used in combination with WRT/ERASE to write into/erase the memory portion 148. VPP is the high voltage power supply for programming the memory portion 148.

Figure 4:
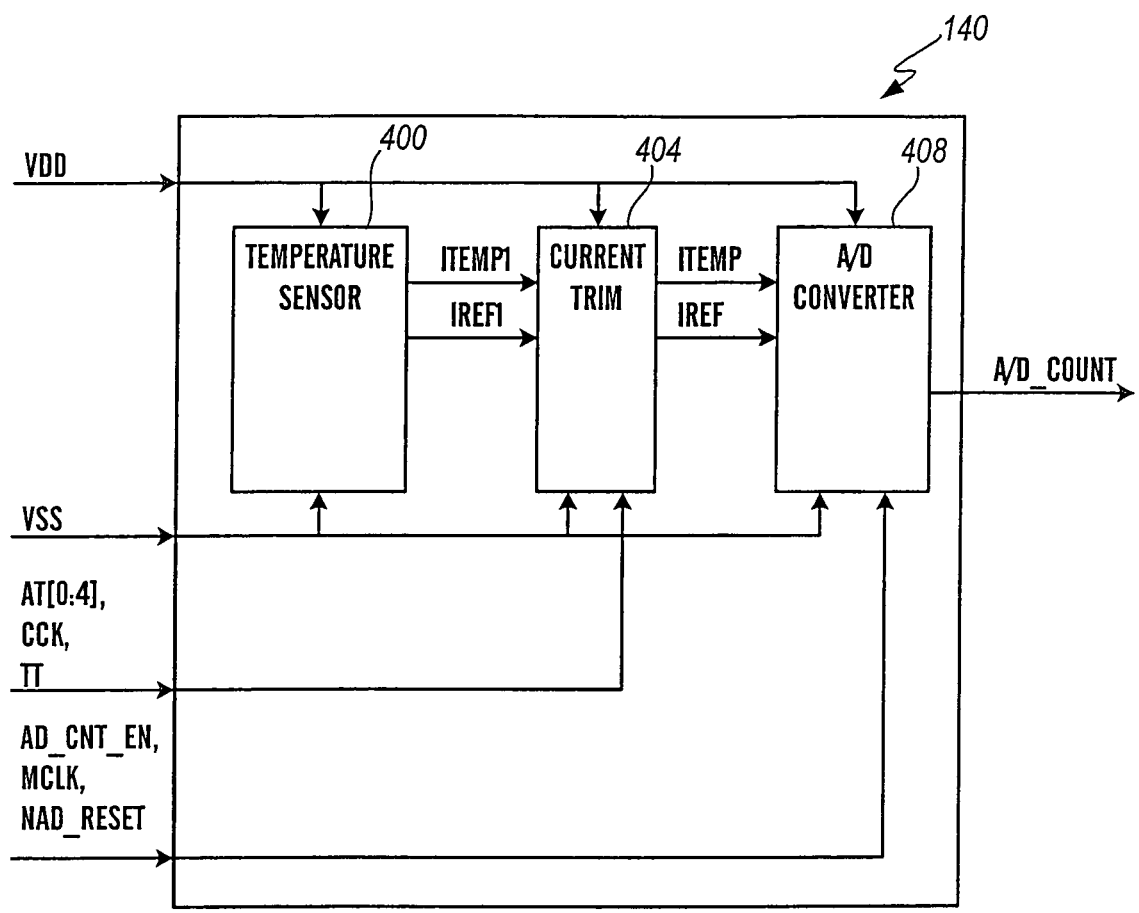
FIG. 4 is a block diagram illustration of a temperature sensing circuit of an embodiment of the present invention.

Referring now to FIG. 4, a block diagram illustration of the temperature sensing portion 140 is now described. The temperature sensing portion 140 includes a temperature sensor 400, a current trim circuit 404, and an A/D converter circuit 408. The temperature sensor 400 utilizes the temperature-proportional characteristic of P-N junction voltage to sense the temperature of the P-N junction. It has been known that a semiconductor P-N junction, in a bipolar junction transistor for example, exhibits a strong thermal dependence. The base-emitter voltage of a bipolar junction transistor decreases almost linearly with temperature. The temperature coefficient is dependent on the emitter current density, with lower current densities associated with higher temperature coefficients. A temperature-proportional current ITEMP1 is derived from the corresponding P-N junction voltage. A temperature-independent current IREF1 is derived from the bandgap reference voltage. The details of a basic temperature sensor will be described in more detail in connection with FIG. 5.

The current trim circuit 404 trims IREF1 and ITEMP1 to IREF and ITEMP respectively, based on the input signal AT[0:4], which is delivered from the memory portion 148. The A/D converter circuit 408 converts the ratio of ITEMP/IREF to a digital count value A/D_COUNT.

Figure 5:
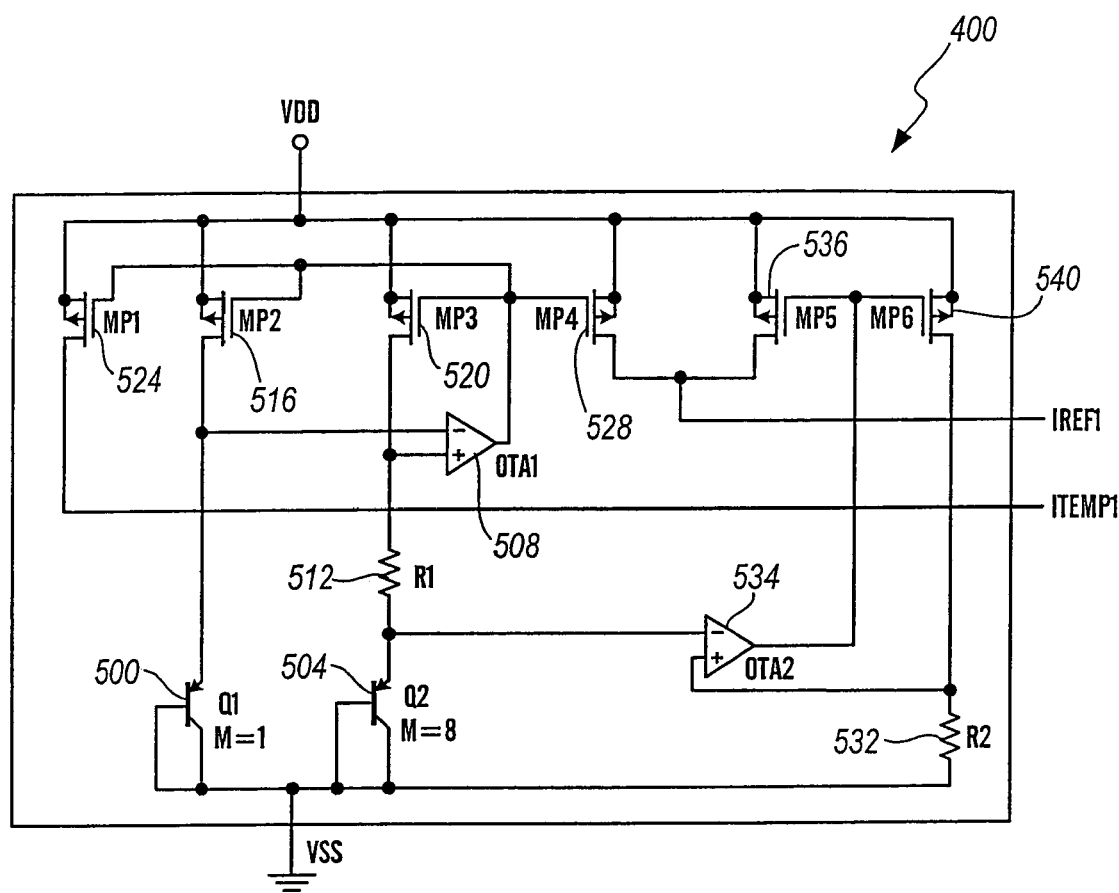
FIG. 5 is a circuit diagram illustrating a temperature sensor of one embodiment of the present invention.

Referring now to FIG. 5, a schematic illustration of a temperature sensor circuit 400 of one embodiment of the present invention is described. The temperature sensor circuit 400 includes a first bipolar junction transistor portion Q1 500, and a second bipolar junction transistor portion Q2 504. The first bipolar junction transistor portion Q1 500, in this embodiment, consists of one (M=1) PNP transistor while the second bipolar junction transistor portion Q2 504 consists of 8 (M=8) PNP transistors. The second bipolar junction transistor portion Q2 504 having eight transistors results in the collective surface area of the base-emitter P-N junctions of Q2 504 being eight times that of Q1 500. The difference between two base-emitter voltages is in a first-order approximation linearly proportional to absolute temperature, and the voltage can be written as $V=(kT/q)\ln(r)$, where r is the emitter current density ratio, T is temperature, k is Boltzmann's constant, and q is the magnitude of electronic charge. Theoretically, any ratio r which is greater than one may be used, with a preferable range of r being 4-16. A value of r=8 is used in the embodiment of FIG. 5 because it forms a symmetric pattern, eight transistors of Q2 504 surround one transistor of Q1 500, in the physical layout of the integrated circuit. The symmetry also helps to minimize offset due to the layout pattern. On the physical layout of the integrated circuit, the surface area of Q2 in this embodiment is approximately 8 times of the surface area of Q1. Alternatively, the second bipolar junction transistor portion 504 may include a single, or multiple, transistors having a base-emitter P-N junction which has approximately eight times the surface area as the base-emitter P-N junction of the first bipolar junction transistor portion 500. Other alternatives, and ratios of P-N junction surface area, may also be used, providing that they provide a suitable ratio of emitter current density for the bipolar junction transistor portions 500, 504.

The emitter of Q1 500 is connected to an offset compensated operational transconductance amplifier OTA1 508. The emitter of Q2 504 is connected to a resistor R1 512, which is connected to the amplifier OTA1 508. Two P-channel metal-oxide semiconductor field-effect transistors MP2 516 and MP3 520 form a current mirror circuit that regulates the emitter current density for Q1 500 and Q2 504.

By keeping the emitter current density in each bipolar junction transistor portion 500, 504 at a constant ratio (e.g. 1:8), the difference in the base to emitter voltage (VDBE=VBE1−VBE2) of the two bipolar junction transistor portions 500, 504 will be directly proportional to the absolute temperature of the transistors. The difference in the base to emitter voltages is reflected as the voltage across the resistor R1 512. It will be understood that other emitter current density ratios could be implemented in a similar fashion, so long as a reliable difference in the base to emitter voltage of the bipolar junction transistor portions 500, 504 is obtained which is directly proportional to the absolute temperature of the transistors.

The temperature-proportional characteristic of VDBE enables IC transistors to produce output signals that are proportional to absolute temperature. The output signal can be either in voltage configuration VDBE or in current configuration IDBE where IDBE=VDBE/R1. The temperature-proportional current IDBE can be mirrored as ITEMP1 using the current mirror circuit formed by MP1 524 and MP3 520. Similarly, the current through MP4 528 is also the mirror current of MP1 524 and MP3 528.

In order to measure absolute temperature of the temperature sensor circuit 400, a temperature-independent bandgap reference is needed. The temperature-independent bandgap reference voltage (VREF1) in this embodiment is obtained using VBE2, VDBE, and a ratio of the resistance of the resistor R1 512, and the resistor R2 532, according to: VREF1=VBE2+VDBE(R2/R1). The resistor R2 532 is connected to amplifier OTA2 534. The bandgap reference voltage can be transformed into a reference current IREF1, where IREF1=VREF1/R2. The reference current can be further expressed as IREF1=(VBE2/R2)+(VDBE/R1), which is the sum of the current through MP5 536 and the current through MP4 528. The current through MP5 536 is the mirror current of MP6 540, which is equal to the current VBE2/R2. The current through MP4 is the mirror current of MP3, which is equal to the current VDBE/R1. IREF and ITEMP1 can be read by the A/D converter 408. In one embodiment, the temperature sensor circuit 400 is fabricated on a silicon integrated circuit, however, other types of semiconductor materials may be used, such as gallium-arsenide or germanium, for example. It should be understood that numerous other alternatives exist for such a temperature sensor, such as a temperature sensor that employs more or fewer transistors in the bipolar junction transistor portions 504, 508, or a temperature sensor which utilizes diodes rather than bipolar junction transistors. In such an alternatives, the voltage drop on the P-N junctions may be used to determine the actual temperature of the transponder.

Figure 6:
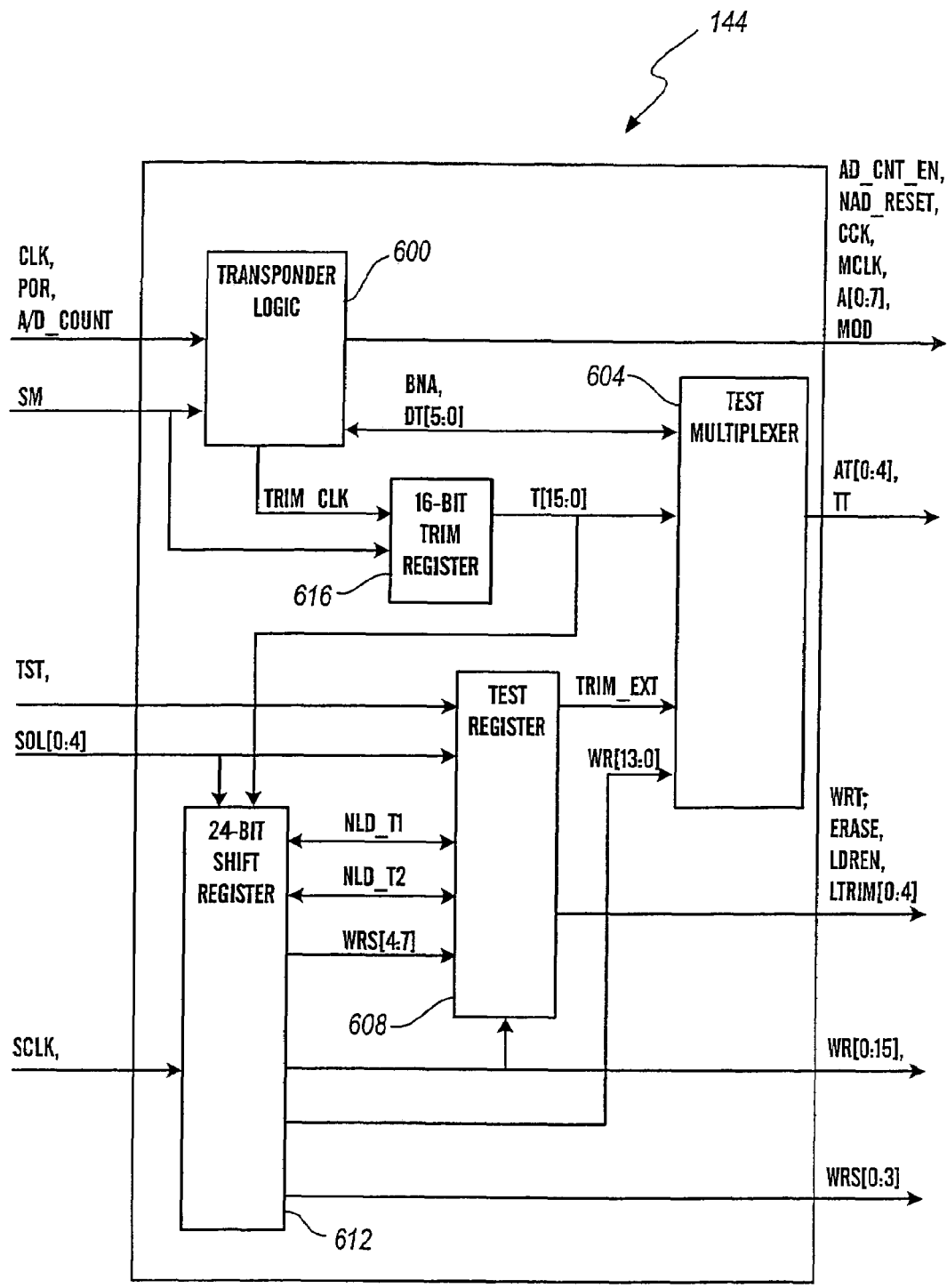
FIG. 6 is a block diagram illustration of processing circuitry for a temperature sensing transponder of one embodiment of the present invention.

Referring now to FIG. 6, a block diagram illustration of the processing portion 144 is now described. The processing portion 144 includes a transponder logic circuit 600, a test multiplexer circuit 604, a test register circuit 608, a 24-bit shift register circuit 612 and a 16-bit trim register circuit 616. The external signals which are received at the processing portion 144 include CLK, POR, A/D_COUNT, SM, TST, SOL[0:4], and SCLK. The processing portion 144 delivers external signals to other portions of the transponder, which include CE2, DIN, AD_CNT-EN, NAD_RESET, CCK, MCLK, A[0:7], MOD, AT[0:4], TT, WRT, ERASE, LDREN, LTRM[0:4], WR[0:15], DATO and WRS[0:3]. Details of these signals were discussed in connection with FIG. 3.

Internal signals within the processing portion 144 include BNA, DT[5:0], T[15:0], TRIM_CLK, TRIM_EXT, WR[13:0], NLD_T1, NLD_T2 and WRS[4:7]. BNA is the signal used to select either a B mode transponder (when BNA is high) or an A mode transponder (when BNA is low). The A and B mode transponder setting corresponds to the type of response signal which is transmitted by the transponder, namely if the required response signal from the transponder is an FDXA type signal, the A mode is selected. Likewise, if the required response signal from the transponder is an FDXB type signal, the B mode is selected. FDXA and FDXB transmissions are ISO standard transmission formats, and will be discussed in more detail below. DT[5:0] are digital temperature trim bits. These digital temperature trim bits are set based on a calibration of the temperature sensing portion 140, and will be discussed in more detail below. T[15:0] are internal trim bits. TRIM_CLK is the trim clock. TRIM_EXT is the trim extract. WR[13:0] are digital test register bits. NLD_T1 signals loading for T[15:0] into a shift register when active low. NLD_T2 signals loading for SOL[0:4] into a shift register when active low. WRS[4:7] are test modes select bits.

The transponder logic circuit 600 generates A/D converter control signals AD_CNT_EN and NAD_RESET, memory addresses A[0:7], clock signals CCK and MCLK, and a modulation signal MOD. The test multiplexer circuit 604 multiplexes either T[15:0] or WR[13:0] onto trim buses AT[0:4], DT[5:0], and nets BNA, TT based on the state of TRIM_EXT. When TRIM_EXT is low, T[4:0]=AT[4:0], T[10:5]=DT[5:0], T14=TT and T15=BNA. When TRIM_EXT is high, WR[4:0]=AT[4:0] and WR[[10:5]=DT[5:0]. WR[13:11] and T[13:11] are spare bits, which may be used for specialized applications. In one embodiment, during normal operation TRIM_EXT is always low and T[15:0] drives the buses and nets, and only during test modes is TRIM_EXT temporary driven high, cleared on reset or writing a clear control code.

The test register circuit 608 contains logic used to decode WRS[4:7] into specific test modes. The test modes are used to write and erase the memory, force the MOD line to be inactive, turn off the A/D converter, and load trim values into the 24 bit shift register. Details of the sequence of testing, tuning, calibrating and programming will be described in connection with FIG. 8.

The 24-bit shift register 612 shifts in 8 control bits and 16 data bits used to program row values for the memory, selects test modes, and generally controls the test register circuit 608. The 16-bit trim register 616 outputs trim bits T[15:0] with the input signal SM. SM is the single memory bit output from the memory portion 148.

Figure 7:
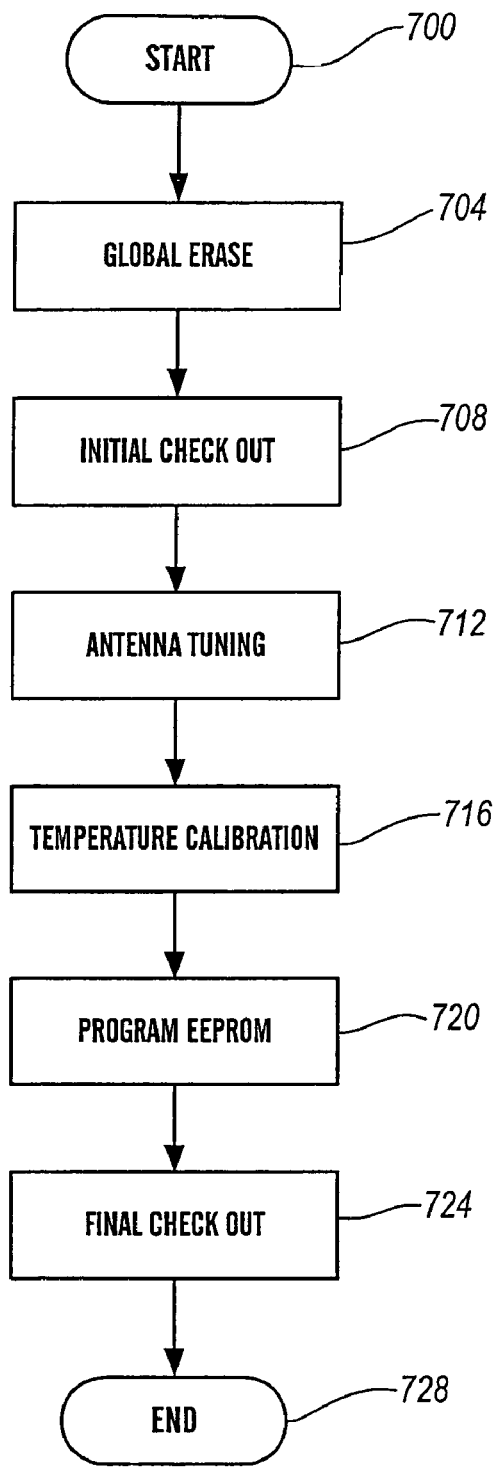
FIG. 7 is a flow chart diagram illustrating the operational steps for testing and calibrating a temperature sensing transponder of one embodiment of the present invention.

Referring now to FIG. 7, a flow chart illustration of the operations for testing, tuning, calibrating and programming of the transponder integrated circuit is now described. In one embodiment, the operations associated with FIG. 7 are performed using an automatic tester during the manufacturing process, while the integrated circuits are still on the semiconductor wafer used for fabrication. Testing, calibration, tuning and programming may thus be completed relatively quickly and easily by the automatic test equipment, eliminating the need to individually test and calibrate each completely packaged transponder. Alternatively, the operations associated with FIG. 7 may be performed at other times, such as after assembly of the integrated circuit into packages, or after the integrated circuits are cut into dies but before packaging. In one embodiment, the sequence is divided into six steps. Initially, the tester starts the sequence, as noted by block 700. At block 704, a global erase is performed to carry out an initial erase of the memory portion 148 to all zeros. The memory portion is any suitable memory device, such as a programmable read only memory. In one embodiment, the memory portion 148 is an electronically erasable programmable read only memory (EEPROM or flash memory).

An initial check out, to determine if the die is functioning and further testing and calibration is warranted, is carried out, as noted by block 708. At block 712, antenna tuning to tune the antenna to its optimal efficiency by trimming its capacitance is performed. Temperature calibration to calibrate the temperature sensor of the transponder integrated circuit is performed, according to block 716. Next, at block 720, the memory portion is programmed to store a unique identification associated with the transponder, transponder selection code to select a type A or type B transponder, analog temperature trim value and digital temperature trim value. Finally, according to block 724, a final check out is performed to ensure that the appropriate data has been programmed to memory and that the calibration has been carried out appropriately. The sequence is then complete, as noted by block 728. It will be understood that the above order in which the sequence is performed may be modified, and steps may be combined, where appropriate for certain applications.

The procedure, in one embodiment, for chip testing involves powering the chip by applying a 134 kHz sine wave carrier to antenna pins, which are included in the test pads. A wafer probe card that contains a transformer circuit and a demodulator circuit serves as an interface between the 134 kHz sine wave source, the transponder integrated circuit, and the automatic tester. The 134 kHz carrier signal is rectified by the transponder integrated circuit to generate the chip VDD. The carrier frequency is also used as the internal chip clock frequency CLK for the digital logic. After a sufficient delay to allow the chip power to stabilize, a serial word is shifted into the chip test register. The data is presented to a test pad as the signal DIN and clocked by serial data clock SCLK. The data clock frequency can be a 1× to 4× multiple of the carrier frequency CLK. In one embodiment, the serial word consists of a concatenated 8-bit control word, and a 16-bit data word. The 8-bit control word represents the test mode and the 16-bit data word contains the input data. The action performed by the chip, when the test enable pin associated with signal CE2 goes high, is determined by the contents of the 8-bit control word.

Figure 8:
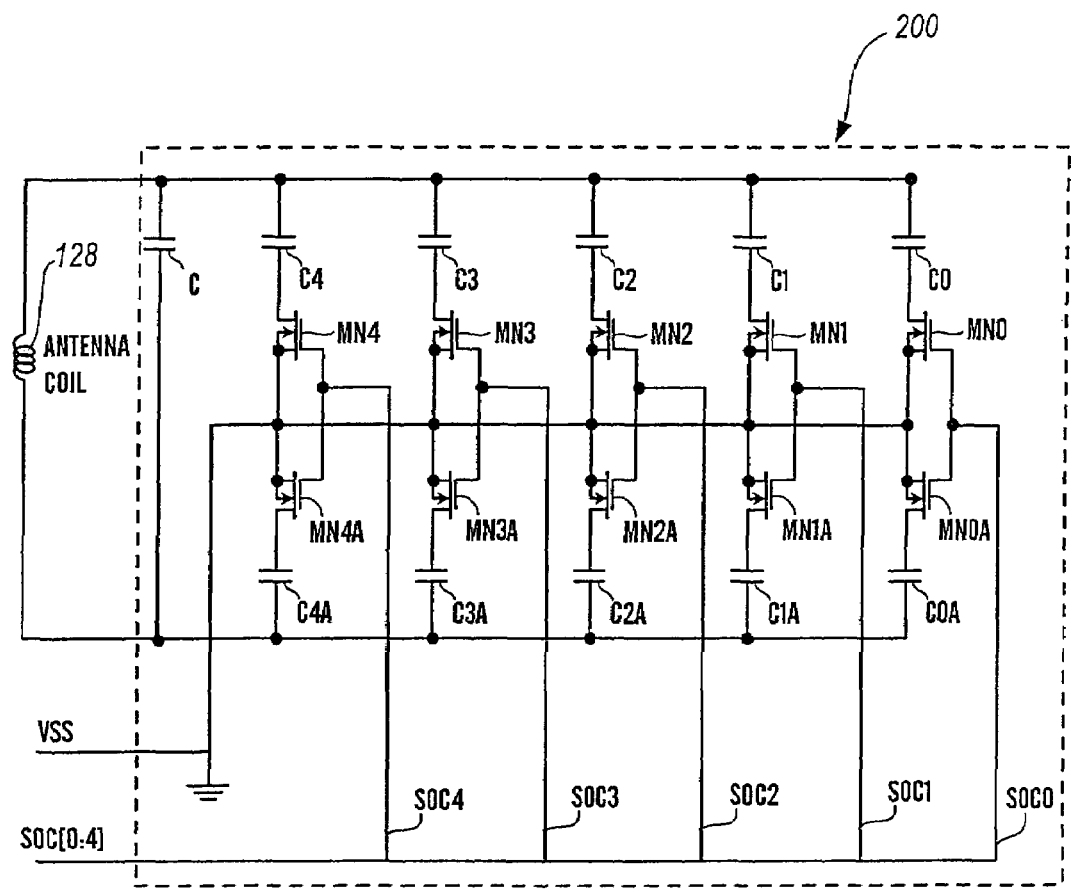
FIG. 8 is a circuit diagram illustrating a tune circuit of one embodiment of the present invention.

Referring now to FIG. 8, a schematic illustration of the antenna tune circuit 200 is now described. The antenna tune circuit 200 consists of a fixed capacitor C and five sets of trim capacitors, a first set C0 and C0A, a second set C1 and C1A, a third set C2 and C2A, a fourth set C3 and C3A, and a fifth set C4 and C4A, that can be selected by the input trim signal SOC[0:4]. In one embodiment, the capacitance of C is 257 pF, and the capacitances of C0 and C0A are 2 pF, C1 and C1A are 4 pf, C2 and C2A are 8 pF, C3 and C3A are 16 pF, and C4 and C4A are 32 pF. The signals SOC[0:4], when active high, turn on the corresponding N-channel MOSFETs. MOSFETs MN0 and MN0A are turned on when SOC0 is active high, MOSFETs MN1 and MN1A are turned on when SOC1 is active high, MOSFETs MN2 and MN2A are turned on when SOC2 is active high, MOSFETs MN3 and MN3A are turned on when SOC3 is active high, and MOSFETs MN4 and MN4A are turned on when SOC4 is active high. When the N-channel MOSFETs are on, the trim capacitors which are associated with the MOSFETs are added to the fixed capacitor C. For an example, if SOC[0:4]=01010, an additional trim capacitance of 20 pF (0×2 pF+1×4 pF+0×8 pF+1×16 pF+0× 32 pF) is added to the fixed 257 pF capacitance. SOC[0:4] can vary between 00000 to 11111, representing an additional 0 pF to 62 pF trim capacitance to the 257 pF capacitance. The total tuned capacitance (CT) can then be trimmed to a specific value between 257 pF to 319 pF. It will be understood that other values of the capacitors maybe used, depending upon the application in which the transponder is to be used, as will be readily understood by one of ordinary skill in the art.

The tune circuit 200, which is associated with the antenna 128, typically comprises an inductance, designed as a coil, and a capacitance, formed by means of a capacitor. The antenna 128 is tuned to its optimal efficiency if the tuned capacitance (CT) matches the inductance of the antenna coil 128 to provide an optimal antenna voltage. The antenna tuning process is performed by the automatic tester during the wafer probe operation. A wafer probe card that contains a demodulator circuit will serve as an interface between the 134 kHz sine wave source, the transponder integrated circuit 132, and the automatic tester.

In one embodiment, a specific 8-bit control word that represents antenna tuning test mode is first shifted into the chip test register. The control word disables the modulation to allow for more accurate trimming of the on chip capacitor. The demodulator circuit has a DC output that is proportional to the peak amplitude of the antenna voltage. The tuning procedure is to shift in a trial 5-bit antenna tune word (SOC [0:4]), bring the test enable pin CE2 high, record the value of the demodulator DC output, then bring the test enable pin low. This procedure continues until an optimal 5-bit antenna tune word is found that produces the maximum DC output from the demodulator. A successive approximation procedure is used to produce the fastest convergence on the optimal antenna tune word. The optimal antenna tune word is then stored into the chip memory.

Figure 9:
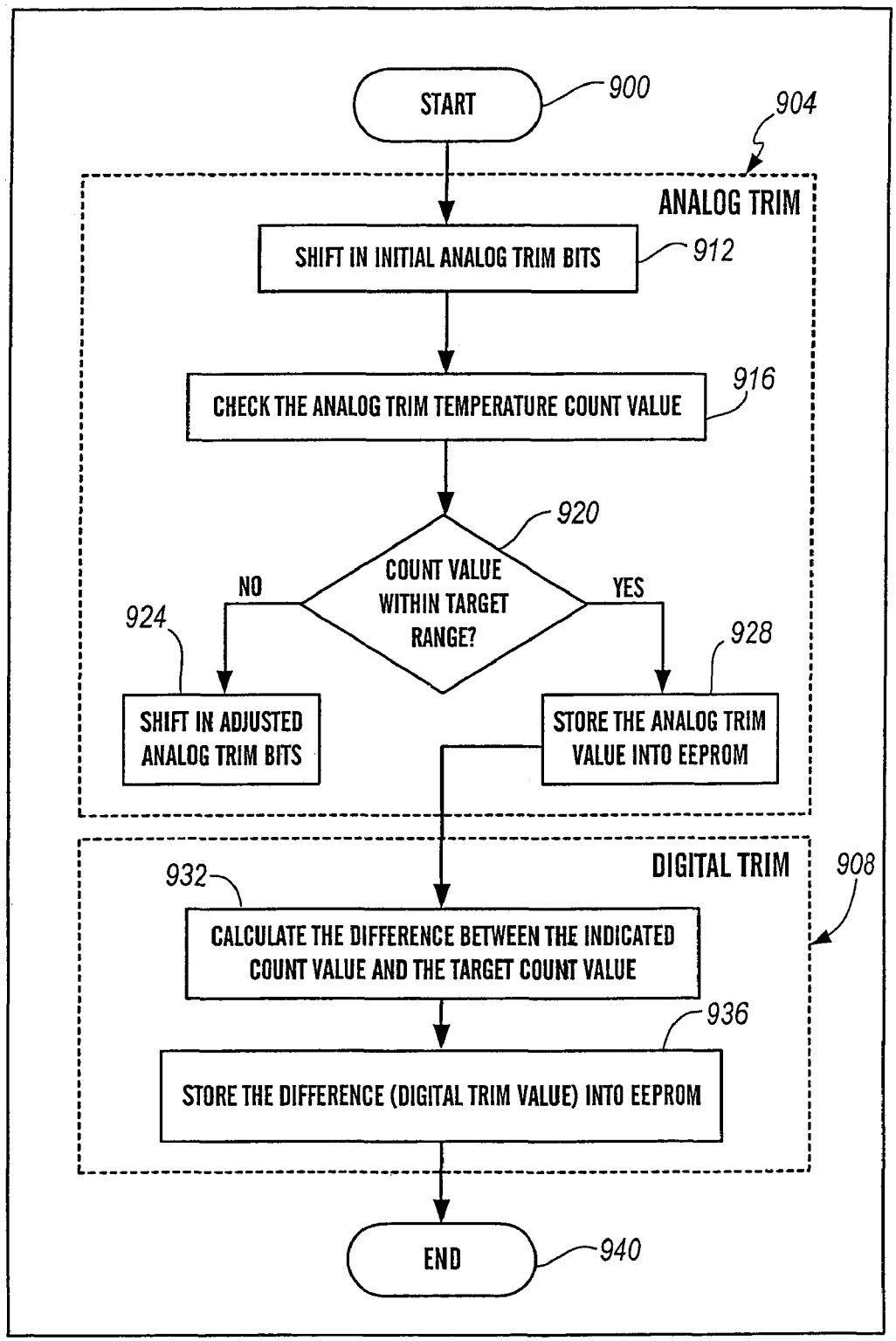
FIG. 9 is a flow chart diagram illustrating the operational steps for calibrating a temperature sensing transponder of one embodiment of the present invention.

Referring now to the flow chart illustration of FIG. 9, the operations for performing temperature calibration by the automatic tester during the wafer probe operation are now described. As the physical parameters of transistors can vary, the magnitude of the difference in base to emitter voltages can also vary for different pairs of transistors. In order to ensure that the temperature output by the transponder is the correct temperature, it is necessary to calibrate the circuit. Variation in the physical parameters of the transistors are the result of typical processing variations in the fabrication of the integrated circuit, and are well understood in the art. The temperature calibration is performed, in one embodiment, during the testing of the temperature sensing transponder integrated circuit. The wafer, and thus the transponder integrated circuit, is kept at a predetermined, known temperature on the tester chuck throughout the whole calibration process. The objective of the temperature calibration is to calibrate the chip temperature sensor such that at a known temperature, a given digital word value A/D_COUNT is telemetered by the chip to the reader.

The temperature calibration is initiated at block 900, and is performed in two major steps. The two major steps are analog trim 904 and digital trim 908. During the analog trim, the analog portion of the temperature sensor is adjusted by the tester such that the proportional to temperature current generated by the temperature sensor is able to span a predetermined temperature range. Initially, according to block 912, the tester first shifts in an initial guess for the analog trim bits AT[0:4], which is based on an expected result based on the predetermined temperature of the test chuck. The analog trim temperature count value is checked, as noted by block 916. The check is performed when the test enable pin is brought high, resulting in a telegram being sent by the transponder integrated circuit to the wafer probe card's demodulator circuit. The demodulated telegram is decoded by the tester to find the 8-bit temperature count value. The tester, as noted by block 920, compares this temperature count value to a predetermined target range for the count value.

If the temperature count value is not within the predetermined target range, the tester adjusts the analog trim bits, and shifts in the adjusted for the analog trim bits AT[0:4], and the operations associated with blocks 916 and 920 are repeated. If, at block 920, the tester determines that the temperature count value is within the predetermined target range, this analog trim temperature count value is recorded by the tester and the analog trim value AT[0:4] is programmed into the memory, as noted by block 928. In one embodiment, the predetermined target range for the temperature count value is ±8 counts. The analog trim value may be used to adjust the gain of the amplification portion of the temperature sensor, to adjust an offset, or both. If the analog trim value is used to adjust the gain of the amplification portion, such as by taking a product of the trim value and the analog trim temperature count, the A/D converter would be able to output a larger or smaller range of temperature values. If the analog trim value is used to adjust an offset, the value of the analog trim value may be simply added or subtracted to the analog trim temperature count, resulting in a consistent range of temperature values able to be output by the A/D converter. Adjustments to both the gain and offset may be used in certain applications which require a larger temperature range to be transmitted by the transponder.

The initial operation in the digital trim step, as noted by block 932, is a calculation of the difference between the target count value and the indicated count value from block 928 as computed by the tester. At block 936, this difference value is programmed into the memory as the digital trim value DT[5:0]. Thus, the calibrated temperature can be computed using the analog and digital trim values. The calibration operation is then complete, as noted by block 940.

While the above discussion with reference to FIG. 9 has been in the context of determining a calibration for a temperature of a transponder, it will be understood that similar techniques may also be used to calibrate a transponder which is capable of detecting other body characteristics, rather than body temperature. For example, a transponder may include a sensor which is capable of sensing pressure. In such a case, the sensor may output an analog signal, which is read by an analog to digital converter, and which is calibrated in a similar manner as described with reference to FIG. 9. Furthermore, the transponder may be embedded in other objects rather than an animal.

Figure 10:
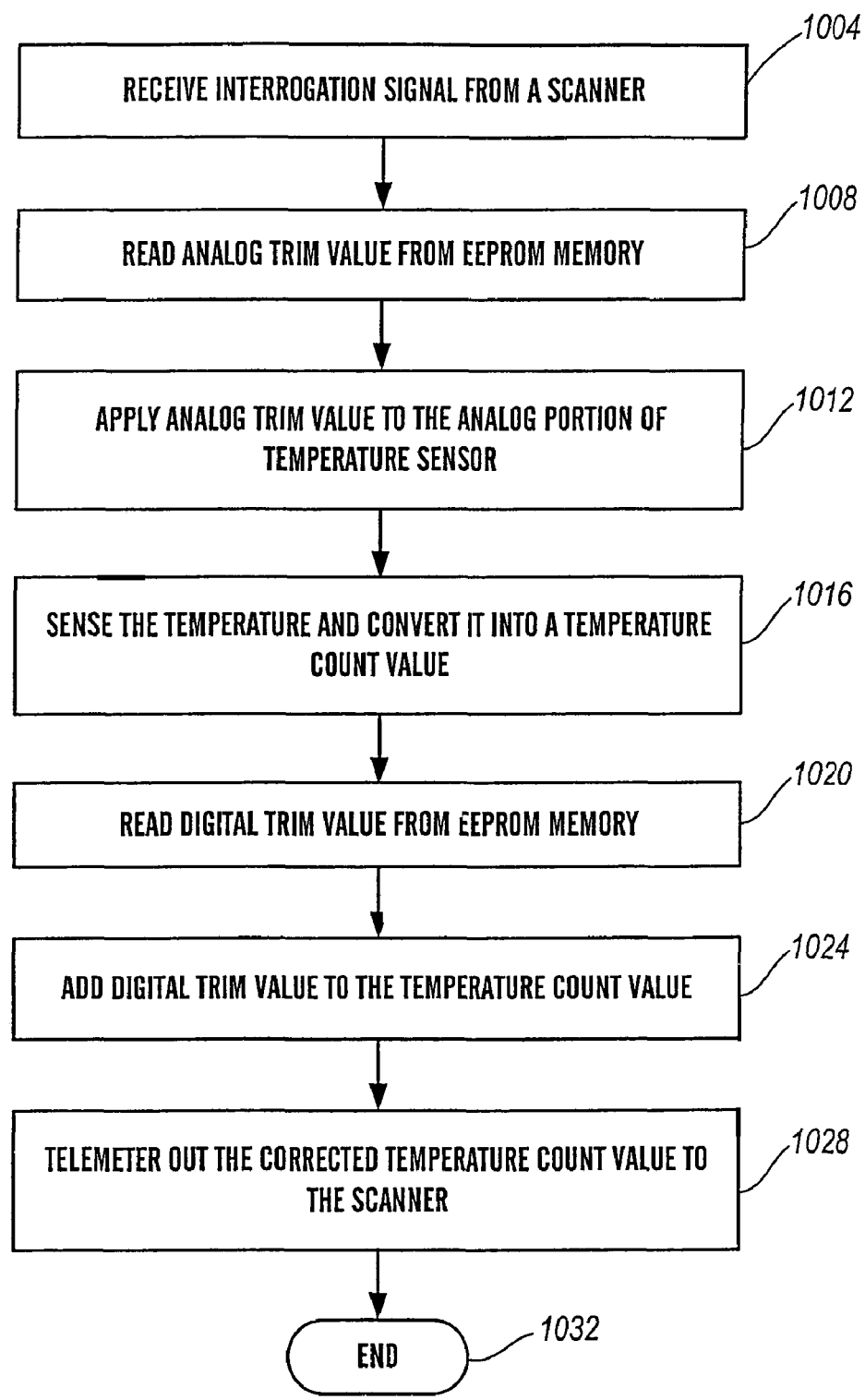
FIG. 10 is a flow chart illustration of the operational steps for transmitting a temperature value from a temperature sensing transponder of one embodiment of the present invention.

Referring now to the flow chart illustration of FIG. 10, the operations associated with obtaining and transmitting a temperature value from the transponder is now described. Initially, according to block 1004, the transponder receives an interrogation signal from a scanner and rectifies the signal to generate the chip VDD power supply. During the "power on reset" when the interrogation field is first applied to the chip antenna coil, the analog trim value AT[0:4] determined from calibration process is read from memory, as noted by block 1008. The analog trim value is applied to the analog portion of the temperature sensor, as noted by block 1012. The temperature sensor senses the temperature of the integrated circuit and converts the analog current ITEMP into a digital count value, according to block 1016.

When it is time to telemeter the temperature data, the processing portion reads the digital trim value from the memory, as noted by block 1020. A serial digital adder within the processing portion takes the digital count value output from the A/D converter and adds the digital trim value, as noted by block 1024. The corrected digital temperature count value is then telemetered to the reader, as noted by block 1028. The operation is then complete, as noted by block 1032. Accordingly, neither of the analog and digital trim values are telemetered to the reader. The correction is automatically made within the transponder before the final temperature digital count value is telemetered to the reader.

When transmitting information to the scanner, the transponder, in one embodiment, transmits a data sequence according to the ISO Standard 11785. ISO standard 11785 is a well known standard which is widely used in telemetering identification data from a transponder to a reader. The ISO standard includes two distinct transmission types, FDXA and FDXB, for transmitting information from a transponder to a reader. In one embodiment, the transponder 104 can be programmed to transmit using either FDXA or FDXB, by setting an A or B mode flag within the transponder integrated circuit.

Figure 11:
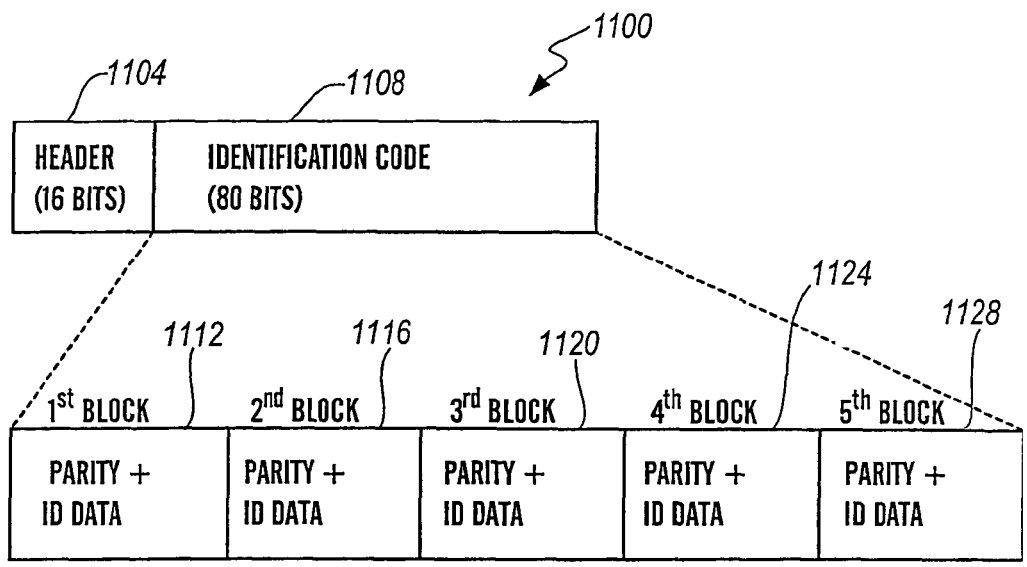
FIG. 11 is a block diagram illustration of an ID telegram for transmitting an identification code using a FDXA transmission.

When transmitting temperature and identification information from the transponder 104 using an FDXA transmission, the transponder 104 first includes identification information in one or more FDXA transmissions, and then temperature information in one or more FDXA transmissions. In this embodiment, the transponder transmits the identification information stored in the memory 148 in an identification telegram. The FDXA signal containing the identification information includes several information fields, and is defined by the ISO 11785 standard. The signal is transmitted at 125 kHz, using amplitude modulation frequency shift keying (AM-FSK), which is read by the reader. The signal uses Manchester encoding, and has a bit rate of 1250 bits/second. The ID telegram structure 1100, as illustrated in FIG. 11, includes two information fields. A header 1104, is included as the first 16 bits of the ID telegram 1100. Following the header 1100 is an 80 bit identification code field 1108, having 70 identification bits and 10 parity bits. The total structure is thus 96 bits. Because the signal uses manchester encoding, the actual number of information bits transmitted in the telegram structure is reduced because the manchester-encoding includes clock information, as is well understood in the art.

Within the identification code field 108 are five data blocks. A first data block 1112 contains parity data and a first portion of identification data. The parity data includes two binary bits, and the first portion of identification data contains the first 14 identification bits from the identification information stored in memory 148. A second data block 1116 contains parity data and a second portion of identification data. The parity data includes two binary bits, and the second portion of identification data contains identification bits 15 through 28 from the identification information stored in memory 148. A third data block 1120 contains parity data and a third portion of identification data. The parity data includes two binary bits, and the third portion of identification data contains identification bits 29 through 42 from the identification information stored in memory 148. A fourth data block 1124 contains parity data and a third portion of identification data. The parity data includes two binary bits, and the third portion of identification data contains identification bits 43 through 56 from the identification information stored in memory 148. A fifth data block 1128 contains parity data and a fifth portion of identification data. The parity data includes two binary bits, and the fifth portion of identification data contains identification bits 57 through 70 from the identification information stored in memory 148. In one embodiment, the identification code stored in memory 148 is a 10-digit hexadecimal number with the odd digits being hexadecimal 8 or less, allowing Manchester encoding in three bits, while the even digits are encoded using four Manchester encoded bits, thus allowing any hexadecimal digit.

Figure 12:
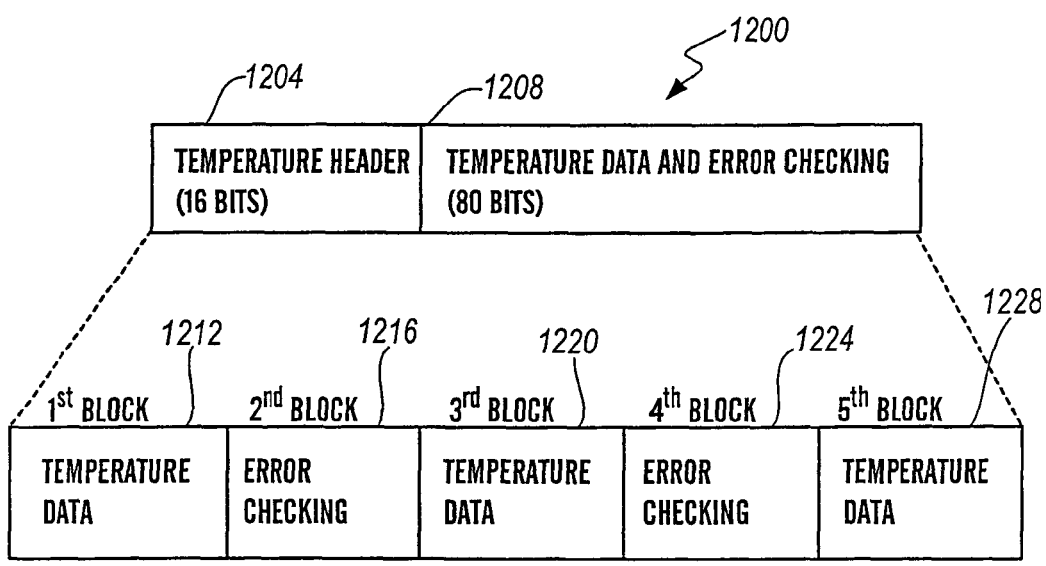
FIG. 12 is a block diagram illustration of an ID telegram for transmitting temperature information using a FDXA transmission.

In this embodiment, the transponder 104 also transmits information related to temperature to the scanner in a temperature telegram. The temperature information is encoded in a temperature telegram structure 1200, as illustrated in FIG. 12. The temperature telegram structure 1200 includes several data fields. First, the temperature telegram structure 1200 has a header field 1204 which has 16 bits. Following the header field 1204 is a temperature data and error checking field 1208. The temperature data and error checking field contains 80 bits, and is divided into five separate data blocks. A first data block 1212 contains 16 temperature data bits, which is 8 manchester encoded data bits. A second data block 1216 contains 16 error checking bits, which in one embodiment are hexadecimal 5555. A third data block 1220 contains 16 temperature data bits, which is 8 Manchester encoded data bits. A fourth data block 1224 contains 16 error checking bits, which in one embodiment are hexadecimal 5555. A fifth data block 1228 contains 16 temperature data bits, which is 8 manchester encoded data bits. The total structure is thus 96 bits.

Other alternatives may be used for the telegram structure used to transmit temperature information, such as, for example, the temperature information being contained in the first field, with the remainder of the telegram structure being filled with stuffing bits. If more or fewer bits are used to encode the temperature information, the fields in the telegram structure would be adjusted to accommodate the larger or smaller number of bits used for the temperature information. Furthermore, the total number of bits transmitted for a telegram structure to transmit temperature information may be adjusted. For example, a shorter telegram structure may be used which contains merely a header, temperature information, and error checking information.

When transmitting the identification information and the temperature information, the transponder uses an auto transmission format due to having to use two distinct telegram structures to transmit the identification and temperature information. In one embodiment, the transponder transmits a predetermined number of ID telegram structures 1100 having the identification information, and then transmits a predetermined number of temperature telegram structures 1200 having the temperature information. In one embodiment, three identification telegram structures 1100 are sent sequentially, and then one temperature telegram 1200 is sent. This is repeated as long as an interrogation signal is present at the transponder. In this embodiment, the headers in each of the ID telegram structures are unique which enables a scanner to determine whether the telegram contains identification or temperature information. For example, the identification telegram 1100 may include a header 1104 having the following binary bits in the header: 0101 0101 0001 1101. The temperature telegram structure 1200 may include the following binary bits in the header 1204: 1010 1010 1110 0010. Thus, the reader is able to determine the telegram structure type, temperature or identification, from the information contained in the header field. Using this type of transmission, a scanner which is not programmed to read temperature information may still be used to obtain identification information, because the identification information is contained in an ID telegram structure which is widely used and well known, namely a structure which conforms to the ISO 11785 standard.

In one embodiment, the reader and transponder operate in a full-duplex transmission, with the reader continuously transmitting an interrogation signal while also receiving the information from the transponder. In this embodiment, the transponder transmits the ID telegrams and temperature telegrams continuously, with no pauses between telegrams. However, it will be understood that other transmission schemes, such as burst transmissions, half-duplex, or pausing between telegrams could also be used.

Figure 13:
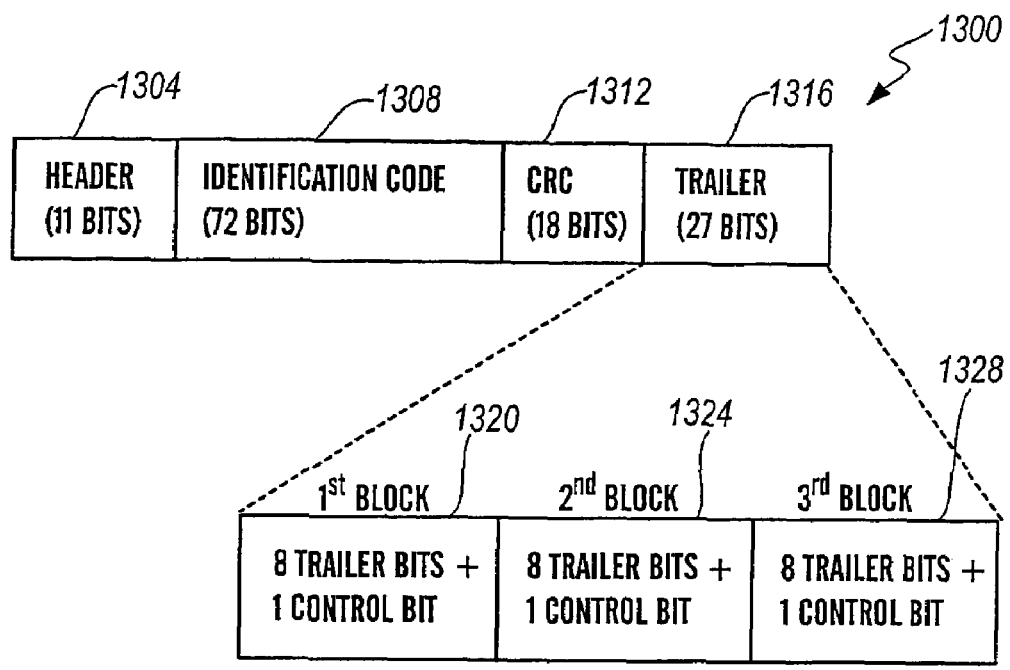
FIG. 13 is a block diagram illustration of an ID telegram for transmitting an identification code using a FDXB transmission.

When transmitting information to the scanner using an FDXB transmission, the transponder, transmits a data structure which contains both identification information as well as temperature information. The FDXB signal containing the identification information includes several information fields, and is also defined by the ISO 11785 standard. The signal is transmitted at 134.2 kHz, using amplitude shift keying (ASK) modulation, which is read by the reader. The signal uses modified differential bi-phase (DBP) encoding, and has a bit rate of 4194 bits/second. The ID telegram structure 1300, as illustrated in FIG. 13, incldes several information fields. A header 1304, is included as the first 11 bits of the structure. Following the header 1304 is a 72 bit identification information field 1308. The identification information field 1308 contains 64 identification bits, and 8 control bits. Following the identification information field 1308 is an 18 bit CRC field 1312. The CRC field 1312 includes 16 CRC bits, and 2 control bits. Following the CRC field 1312, is a trailer field 1316, having 27 bits. The trailer field 1316 includes 24 trailer bits, and 3 control bits. The trailer field 1316 includes three data blocks. A first data block 1320 contains 8 trailer bits and one control bit. A second data block 1324 contains 8 trailer bits and one control bit. A third data block 1328 contains 8 trailer bits and one control bit. The total structure is thus 128 bits.

Figure 14:
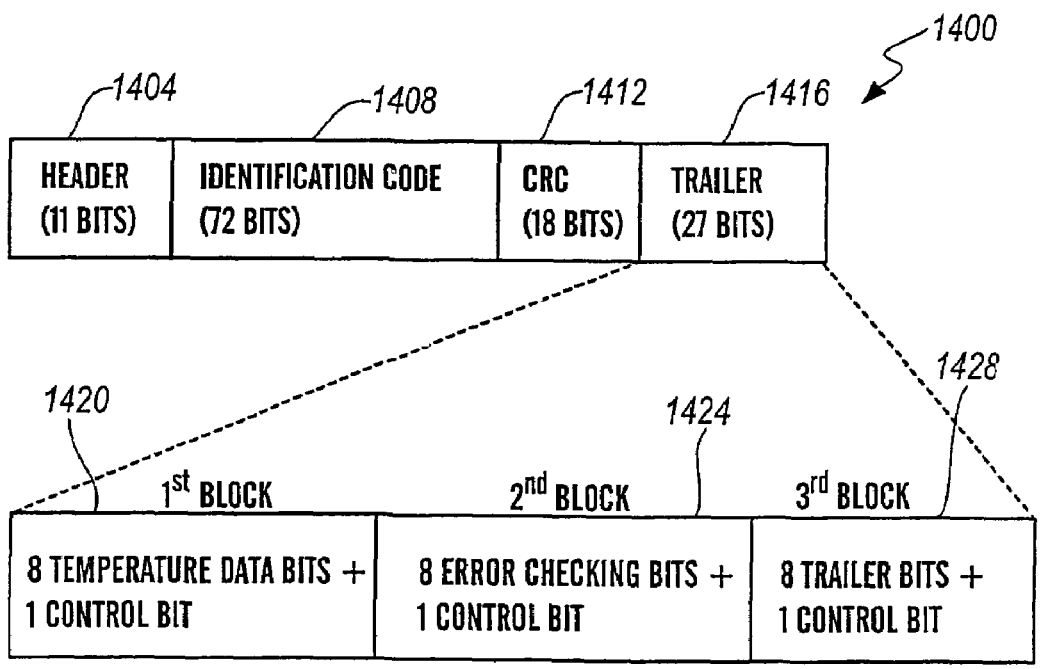
FIG. 14 is a block diagram illustration of an ID telegram for transmitting an identification code and temperature information using a FDXB transmission.

The transponder also transmits information related to temperature to the scanner. The temperature information is encoded in the ID telegram structure 1400, as illustrated in FIG. 14. The ID telegram structure 1400 includes several data fields. A header 1404, is included as the first 11 bits of the structure. Following the header is a 72 bit identification information field 1408. The identification information field contains 64 identification bits, and 8 control bits. Following the identification information field 1408 is an 18 bit CRC field 1412. The CRC field 1412 includes 16 CRC bits, and 2 control bits. Following the CRC field 1412, is a trailer field 1416, having 27 bits. The trailer field 1416 includes a first block 1420, a second block 1424, and a third block 1428, with each block having 9 bits. In this embodiment, the first block 1420 contains temperature information, and has 8 temperature bits, and one control bit. In this embodiment, the transponder encodes the digital temperature information into an 8 bit temperature data block, which can be used by the scanner to indicate the temperature of the transponder. The second block 1424 contains 8 error checking bits, and one control bit, and the third block 1428 contains 8 trailer bits and 1 control bit. The total structure is thus 128 bits. It will be understood that the temperature information may be encoded in the trailer field in alternative manners, such as, for example, the second block containing the temperature information, with the first and third trailer fields containing trailer or error checking bits and a control bit. Furthermore, if the temperature information is contained in more or fewer data bits, the trailer or error checking fields can be modified to contain the appropriate temperature information and error checking information.

When transmitting the identification and temperature information, the transponder uses an auto transmission format which acts to transmit the identification and temperature information continuously. Since the telegram structure contains both the identification and temperature information, it is not necessary to transmit a second telegram structure containing temperature information separately from a first telegram structure containing identification information, as is the case in an FDXA transmission. In one embodiment, the telegram structure includes a header having the following binary bits in the header: 00,000,000,001. The scanner is able to determine the telegram structure type from the information contained in the header field. As mentioned above, the scanner and transponder operate in a full duplex mode with no pause between successive telegrams, but could readily be modified to transmit in half-duplex mode or with pauses between telegrams.

Since the transponder transmits identification and temperature information in standardized form according to the ISO standard 11785, this allows readers which are not programmed to receive temperature information to continue to receive identification information. For example, a reader which is not capable of reading temperature information may be used to scan a transponder which is capable of transmitting temperature information according to one of the embodiments of the present invention. The transponder will transmit both the identification information, and the temperature information, as described above. If the reader is capable of reading standard FDXA or FDXB transmissions, the reader will be able to read the identification information contained in the transmissions. This allows for additional readers, which may not be capable of reading temperature information transmitted by the transponder, to be used for identification purposes, and can help identify a host even if a user is not using a reader which is capable of reading temperature information.

Figure 15:
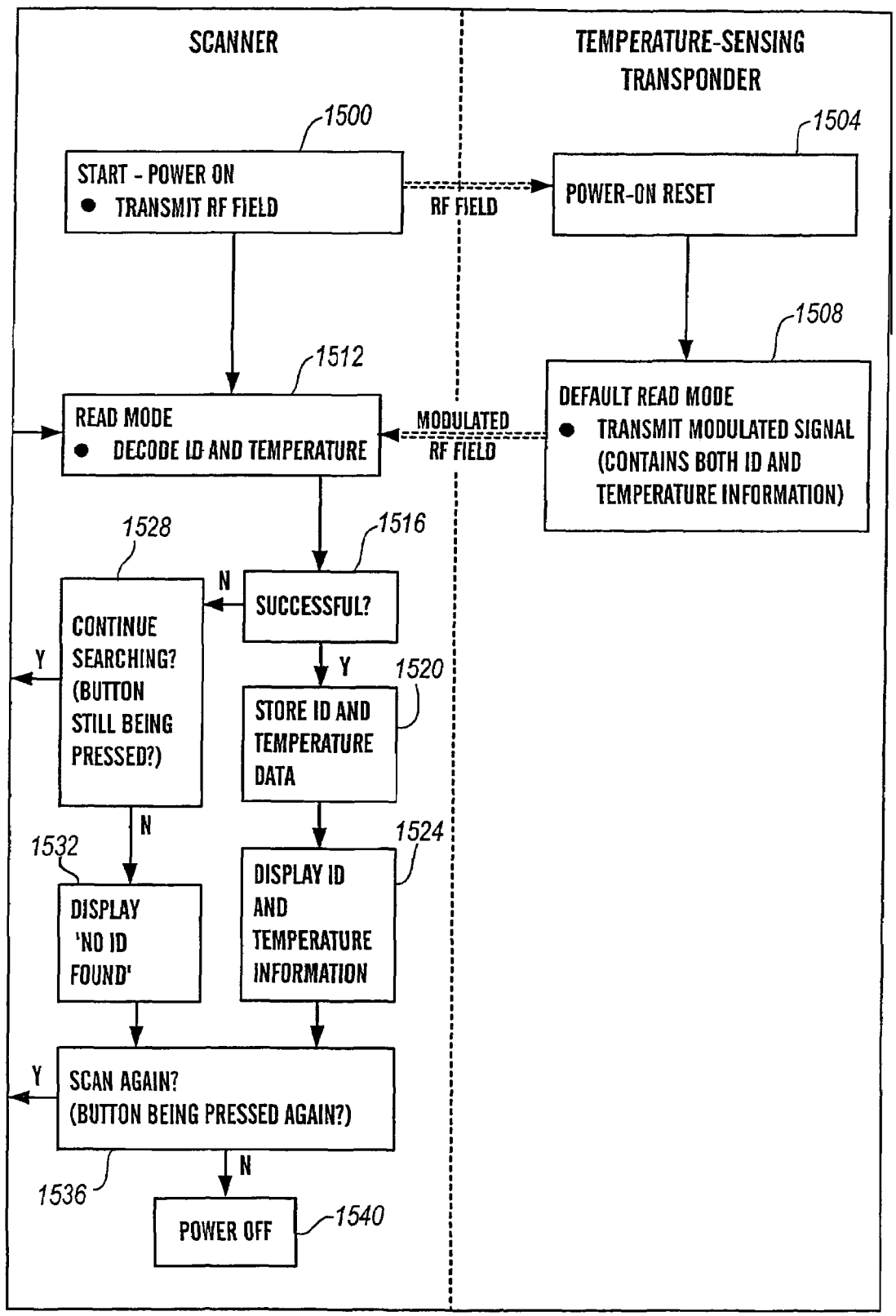
FIG. 15 is a flow chart illustration of the operational steps of a scanner and temperature sensing transponder system of one embodiment of the present invention.

With reference now to the flow chart illustration of FIG. 15, the operation of the scanner and the transponder will now be described. Initially, the scanner is used to transmit an RF field to the transponder, as noted by block 1500. The transponder receives the RF field, and uses energy from the RF field to power on the transponder integrated circuit, at noted by block 1504. When the transponder powers on, it resets all of the components, reads the configuration data for the transponder which is stored in memory, and determines the transponder type. The transponder type is, in one embodiment, an FDXA or an FDXB transponder, which is set during the initial programming and testing of the transponder. In another embodiment, the transponder can be reprogrammed, and change transponder types based on the reprogramming, i.e., from FDXA to FDXB or vice-versa. Such reprogramming may be performed in the field, using a reader which is operable to transmit a signal containing data which the transponder can read and store in memory. Such reprogramming techniques, including the readers and transponders associated therewith, are known in the art. Furthermore, a transponder may be programmed to recognize a flag from a reader, and transmit Once the transponder is powered on, it runs in a default read mode, as noted by block 1508. In the default read mode, the transponder transmits the appropriate modulated RF field to the scanner, which contains both identification and temperature information. The scanner, after starting transmission of the transmit RF field, enters a read mode, where it waits to receive the modulated RF field from the transponder, as noted by block 1512. When the scanner receives the modulated RF field, it decodes the identification and temperature information. The scanner determines if the identification and temperature information were successfully decoded at block 1516. If the scanner was successful in decoding the information, it stores the identification and temperature data, as noted by block 1520. In one embodiment, the scanner has a memory which can store a predetermined amount of identification and temperature information, which can be transferred to a computer or other device for monitoring over a period of time. At block 1524, the scanner displays the identification and temperature information on a display, which a user can use to verify that a successful reading was obtained.

If the scanner determines at block 1516 that the identification and temperature information was not successfully decoded, the scanner determines whether it should continue searching, as noted by block 1528. The scanner makes this determination, in one embodiment, according to whether a user continues pressing a send button on the scanner. If the scanner determines that it is to continue searching, it returns to block 1512. If the scanner determines that it is not to continue searching, it displays an error message on the display, as noted by block 1532. In one embodiment, the scanner displays "No ID Found" on the display, indicating to the user that the scan was not successful in returning identification or temperature information. The scanner, after displaying either the identification and temperature information at block 1524, or displaying the error message at block 1532, then determines if another scan is requested, as noted by block 1536. In one embodiment, the scanner makes this determination according to whether a user is pressing a send button on the scanner. If the scanner determines that it is to scan again, it returns to block 1512. If the scanner determines that it is not to scan again, it powers off, as noted by block 1540.

In a further embodiment, the transponder may also collect other information from a host animal or other object in which the transponder is embedded, such as pressure, PH, blood sugar, blood oxygen, heart rate, or other diagnostic measurement. In this embodiment, if the transponder transmits using FDXA, it cycles through several transmissions to complete the transfer of all of the information collected. If the transponder transmits using FDXB, the additional information may be transmitted in the remaining trailer which is not used by the temperature information.

In one embodiment, the transponder is programmable to change transmission modes. In this embodiment, the transponder is programmed during testing and calibration, prior to being implanted into the host animal to transmit using either FDXA or FDXB transmission. Alternatively, as mentioned above, the transponder may be field programmable and can be programmed even after being implanted into the host animal. The programming is accomplished using electronically erasable programmable read only memory (EEPROM or flash memory). The transponder may be programmed either during the test portion of the fabrication process, or in the field using the scanner which has a mode which is capable to write to the memory.

In another embodiment, the memory in the transponder is capable of being programmed by the transponder, and can store information other than identification information to transmit to a scanner. For example, the transponder may be programmed with an owner's name and/or telephone number. In this embodiment, the transponder is able to be programmed with the additional information following the manufacturing process. A scanner may have a programming mode, which is used by the transponder to program the additional information. Following the programming, the transponder will transmit the additional information when it transmits the identification and temperature information. This may be done, in the case of an FDXA enabled transponder, by adding another transmission after the identification and temperature transmissions, which contains the information. In the case of an FDXB transponder, the additional bits in the trailer may be used to transmit this additional information, or the transponder may recycle and send another telegram containing additional information.

Furthermore, a transponder may be programmed with additional information, including history information, about the host, such as name, last medical examination date, last vaccination, and other similar information. In such a case, for example, a veterinarian may have a scanner which receives this information from the transponder when an animal initially begins treatment. The veterinarian may than have a record of the animal's name, body temperature, last examination, last vaccination, and other information prior to beginning the next examination. Once the examination is complete, the transponder can be programmed with updated information, using a scanner which is capable of transmitting programming information to the transponder.

While the transponder described above with reference to the drawing figures has been discussed primarily in reference to sensing a body characteristic of a host animal, it will be understood that other applications exist for the use of such a device. For example, such a transponder may be used in transferring materials which are required to be kept at a certain temperature, for example, organ transfers and transporting perishable food in a refrigeration truck. Similarly, other industrial applications exist, such as a transponder capable of sensing the temperature of a component of a machine or other apparatus. The above described invention may be used in such applications to identify a body characteristic associated with the body in which the transponder is embedded or mounted.

In another embodiment, the present invention includes a modified interrogator which is able to read modified telegrams transmitted by the transponder. As described herein, the term "read" when used in reference to an interrogator or scanner, is used to describe the function of the interrogator in determining information transmitted by the transponder. As discussed above with respect to FIGS. 11-14, the transponder, in one embodiment, may transmit an FDXA or FDXB telegram including identification and temperature information. The interrogator, in this embodiment, is capable of reading transponders transmitting FDXA or FDXB telegrams and transponders transmitting identification information only, or both identification and temperature (or other) information. Furthermore, the interrogator in this embodiment is capable of reading information from transponders transmitting in formats other than those defined by ISO standard 11785.

Figure 16:
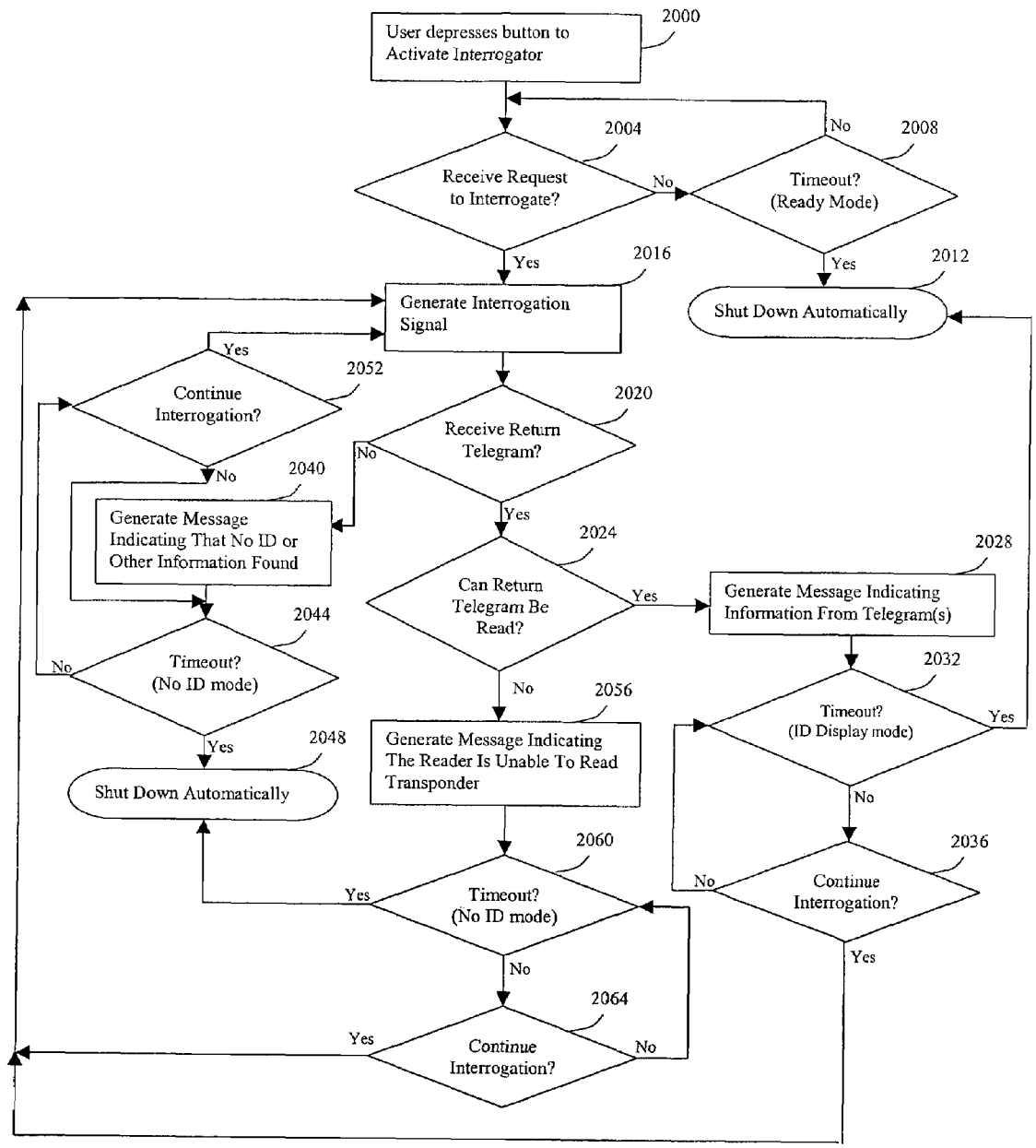
FIG. 16 is a flow chart illustration of the operational steps of an interrogator of one embodiment of the present invention.

With reference now to FIGS. 16-19, the operational steps performed by an interrogator of this embodiment are now described. Referring first to FIG. 16, the interrogator begins interrogation at according to block 2000 when a user depresses or actuates a button to activate the interrogator. In this embodiment, the interrogator enters into a "Ready Mode" upon depression of the button on the scanner, in which all of the electronics within the interrogator are powered up, but an interrogation signal is not yet transmitted from the interrogator. The interrogator may have a display indicating that the interrogator is "Ready To Scan," or some similar message indicating to the user that the interrogator is operational. In one embodiment, the interrogator performs a self-diagnostic routine upon entering the Ready Mode, and any errors detected during the diagnostic are displayed. The interrogator may be a hand-held, battery powered, unit, in which case a battery level check may be performed and a battery level may be indicated on the display. When in the Ready Mode, the interrogator determines if an interrogation request is received, as noted by block 2004. The interrogation request is made by a user, in one embodiment, by depressing or actuating a "scan" button. This button may be the same button depressed to activate the interrogator, or may be a different button. If the interrogator determines that an interrogation request has not been received, it is determined if a timeout period has elapsed, according to block 2008. The timeout period while in Ready Mode, in one embodiment, is five (5) seconds. It will be understood that the timeout period may be any length of time. The five second timeout period for Ready Mode, in this embodiment, is selected to conserve power while giving a user time to request an interrogation. If the timeout period has elapsed in block 2008, the interrogator shuts down automatically, as indicated at block 2012. If the timeout period has not elapsed, the interrogator repeats the operational steps of blocks 2004 through 2012. If, at block 2004, a request to interrogate has been received, the interrogator generates an interrogation signal, as noted by block 2016.

It will be understood that the operations described with respect to blocks 2000 through 2016 may be modified according to the use of the interrogator. For example, the embodiment described is a preferred embodiment for a battery powered, hand-held unit in which it is advantageous to conserve power in order to have an increased battery life. In other situations, such as, for example, an interrogator unit which is not battery powered but is connected to a constant power supply, the interrogator unit may have a power switch which turns power on to the interrogator. The interrogator would then simply determine if an interrogation request is received. Similarly, an interrogator unit may be mounted to an entrance or other passage through which an animal having a transponder may pass. In this embodiment, the interrogator may continuously generate an interrogation signal, generate an interrogation signal at predetermined time intervals, or generate an interrogation signal when a sensor (such as a floor mat which senses an animal is on the mat) associated with the interrogator detects that an animal is present. Such an interrogator may be used, for example, at the doorway to an animal clinic to provide medical personnel with identification and body characteristic information of animals entering the clinic.

Referring again to FIG. 16, following the generation of the interrogation signal at block 2016, the interrogator determines if a return telegram is received, according to block 2020. When determining if a return telegram is received, the interrogator searches for a return signal having predetermined characteristics. The receive portion of the interrogator includes an antenna portion and associated hardware to receive a signal from a transponder and demodulate the signal, generating a data signal. If the interrogator is able to generate such a data signal, it is determined that a return telegram has been received. Following the determination that a return telegram has been received, it is determined if the return telegram can be read, according to block 2024. The determination of whether a telegram can be read will be described in more detail below. If the return telegram can be read, the interrogator generates a message indicating the information contained in one or more of the telegrams, as indicated by block 2028. The information contained in the telegram(s) may include identification information and/or other information, such as temperature information indicating the temperature of the transponder.

Following the generation of the message indicating the information from any received telegram(s), the interrogator in this embodiment enters into an "ID Display Mode" in which the interrogator displays the information from the return telegram(s) on an output display. When in this mode, the interrogator, at block 2032, determines if a timeout for the display has elapsed. This timeout period, in one embodiment, is 72 seconds, which provides a user with time to record the displayed information. It will be understood that other alternatives exist for the output of the information contained in any received telegram(s), including the display of all of the information on a display screen associated with the interrogator, display of a portion of the information from the return telegram(s), alternating display of information if the return telegram(s) contain more than a single type of information, and output of the information to a remote display, printer, or storage medium for later retrieval, to name but a few. If the timeout period has not elapsed at block 2032, the interrogator determines whether to continue interrogation, as noted at block 2036. This determination is made, in one embodiment, by determining if a user is depressing or actuating a scan button on the interrogator. If it is determined that interrogation is not to be continued, the interrogator repeats the steps of blocks 2032 through 2036. If the timeout period has elapsed at block 2032, the interrogator shuts down automatically, according to block 2012. If, at block 2036, the interrogator determines that interrogation is to continue, the operational steps beginning at block 2016 are repeated.

If, at block 2020, the interrogator determines that a return telegram has not been received, the interrogator generates a message indicating that no ID or other information was found, as indicated by block 2040. The interrogator, after determining that a return telegram has not been received at block 2020, enters into a "No ID Found" mode. Following block 2040, the interrogator determines if a timeout period associated with the No ID Found mode has elapsed, as noted by block 2044. In one embodiment, the timeout period for the No ID Found mode is 12 seconds. This time period can vary. If the timeout period has expired, the interrogator shuts down automatically, at block 2048. If the timeout period has not expired, the interrogator determines whether to continue interrogation, as noted by block 2052. If it is determined that interrogation is not to continue, the interrogator repeats the steps beginning at block 2044.

If, at block 2020, the interrogator determines that a return telegram is received, but at block 2024 it is determined that the return telegram cannot be read, the interrogator generates a message indicating that the interrogator is unable to read the transponder, as noted by block 2056. Following the determination that the return telegram cannot be read, the interrogator enters the No ID Found mode, and determines if the timeout for this mode has elapsed, according to block 2060. If the timeout period has elapsed, the interrogator shuts down automatically, as indicated at block 2048. If the timeout period has not elapsed, the interrogator determines if interrogation is to be continued, as noted by block 2064. As mentioned above, the timeout period, in one embodiment, for the No ID Found mode, is 12 seconds, but could be different. If, at block 2064 it is determined that interrogation is not to be continued, the interrogator repeats the steps described with respect to blocks 2060 through 2064. If it is determined that the interrogation is to be continued, the interrogator repeats the operational steps described beginning with the step associated with block 2016.

As will be understood, the operational steps of the interrogator of the embodiment described with respect to FIG. 16 may be performed in other sequences, certain steps may be combined, or reduced to additional sub-steps. Furthermore, the embodiment of FIG. 16 is one of numerous embodiments for an interrogator of the present invention. As mentioned above, other embodiments include, but are not limited to, interrogators having other power sources, thus not requiring some of the power-saving features described with respect to FIG. 16, and permanent or semi-permanent mounted interrogators associated with a passage that continuously generate interrogation signals.

Figure 17:
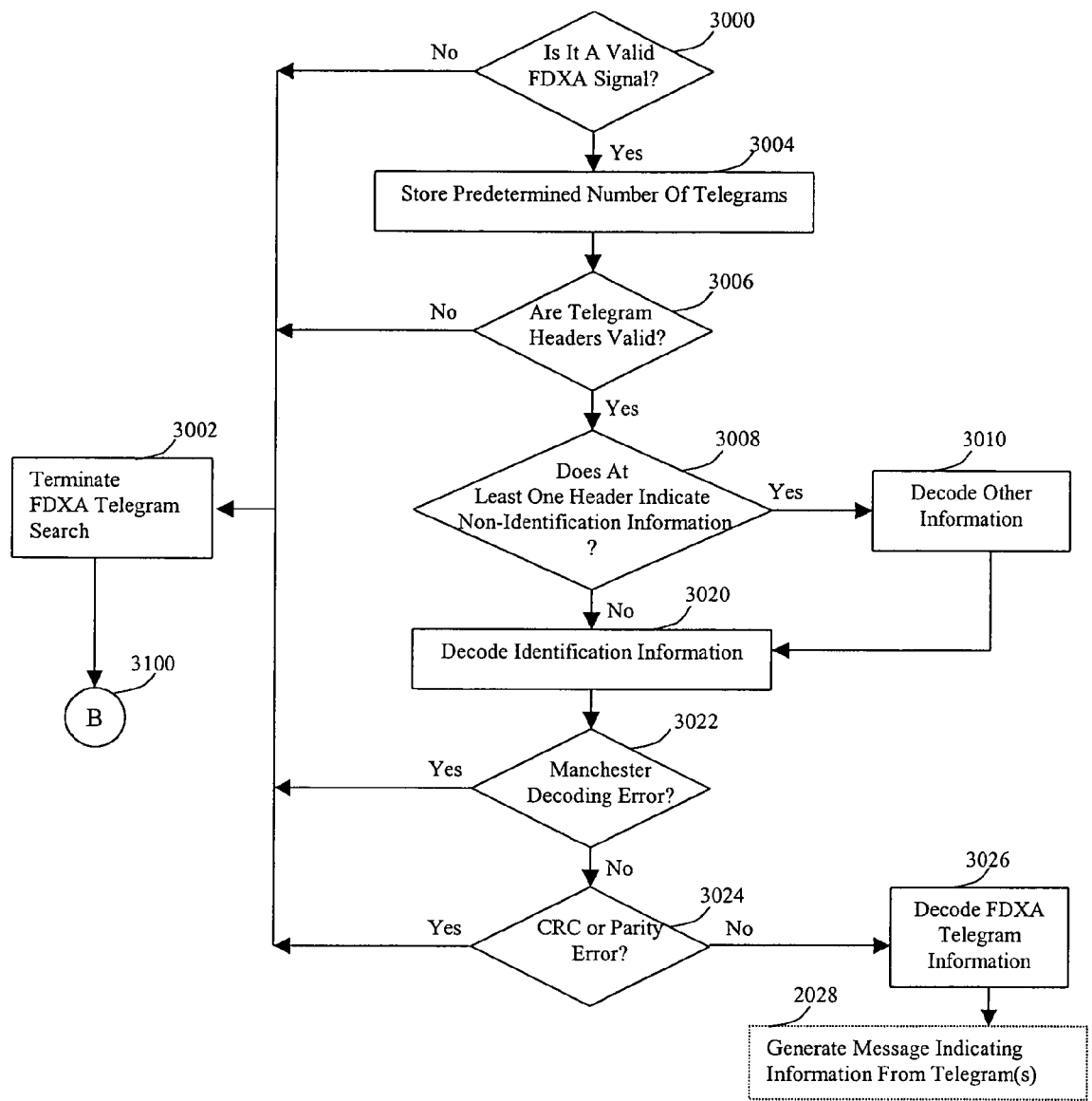
FIG. 17 is a flow chart illustration of the operational steps of an interrogator when determining the content of transmission from a transponder communicating in FDXA format, of one embodiment of the present invention.
Figure 18:
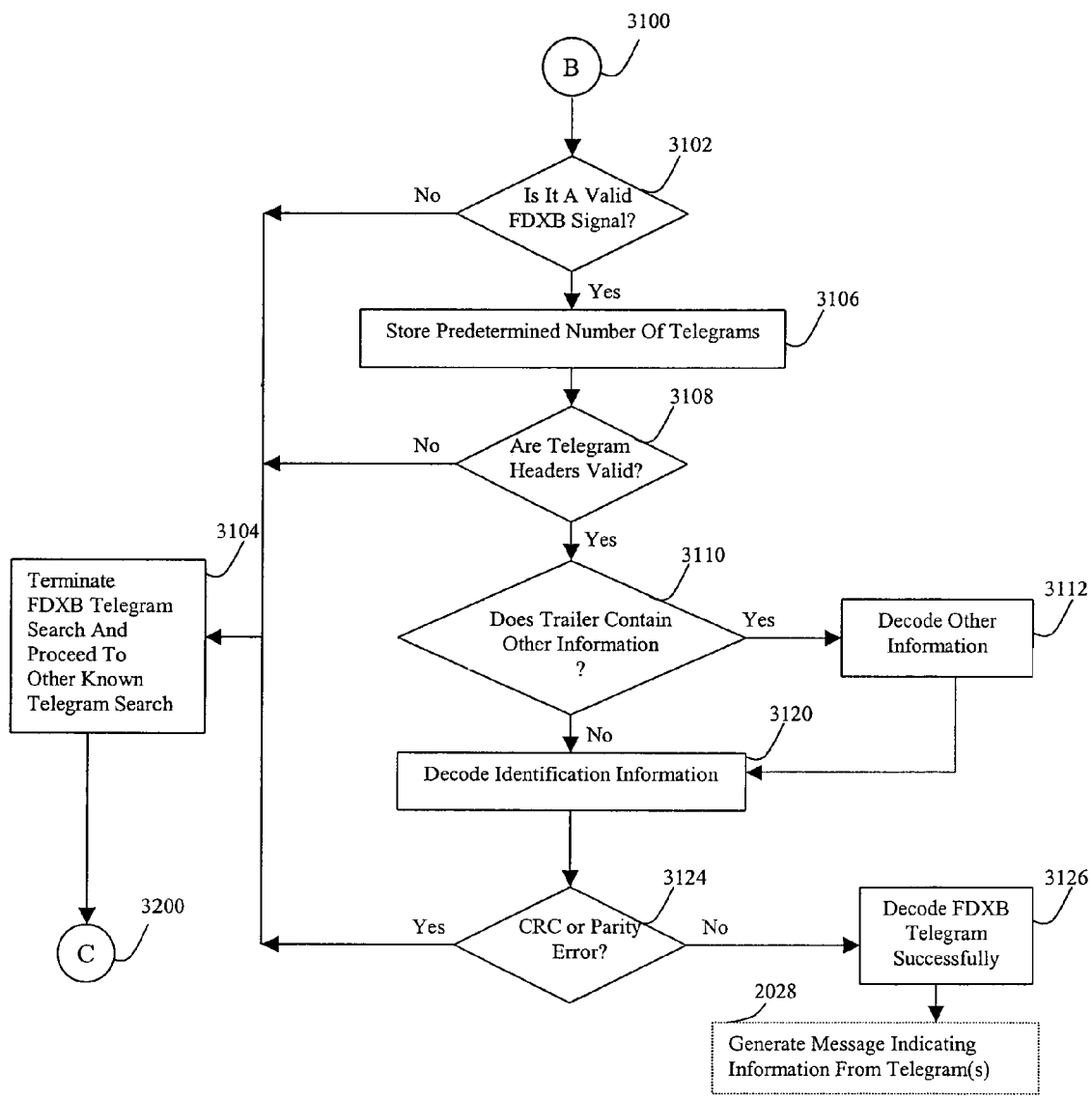
FIG. 18 is a flow chart illustration of the operational steps of an interrogator when determining the content of transmission from a transponder communicating in FDXB format, of one embodiment of the present invention.
Figure 19:
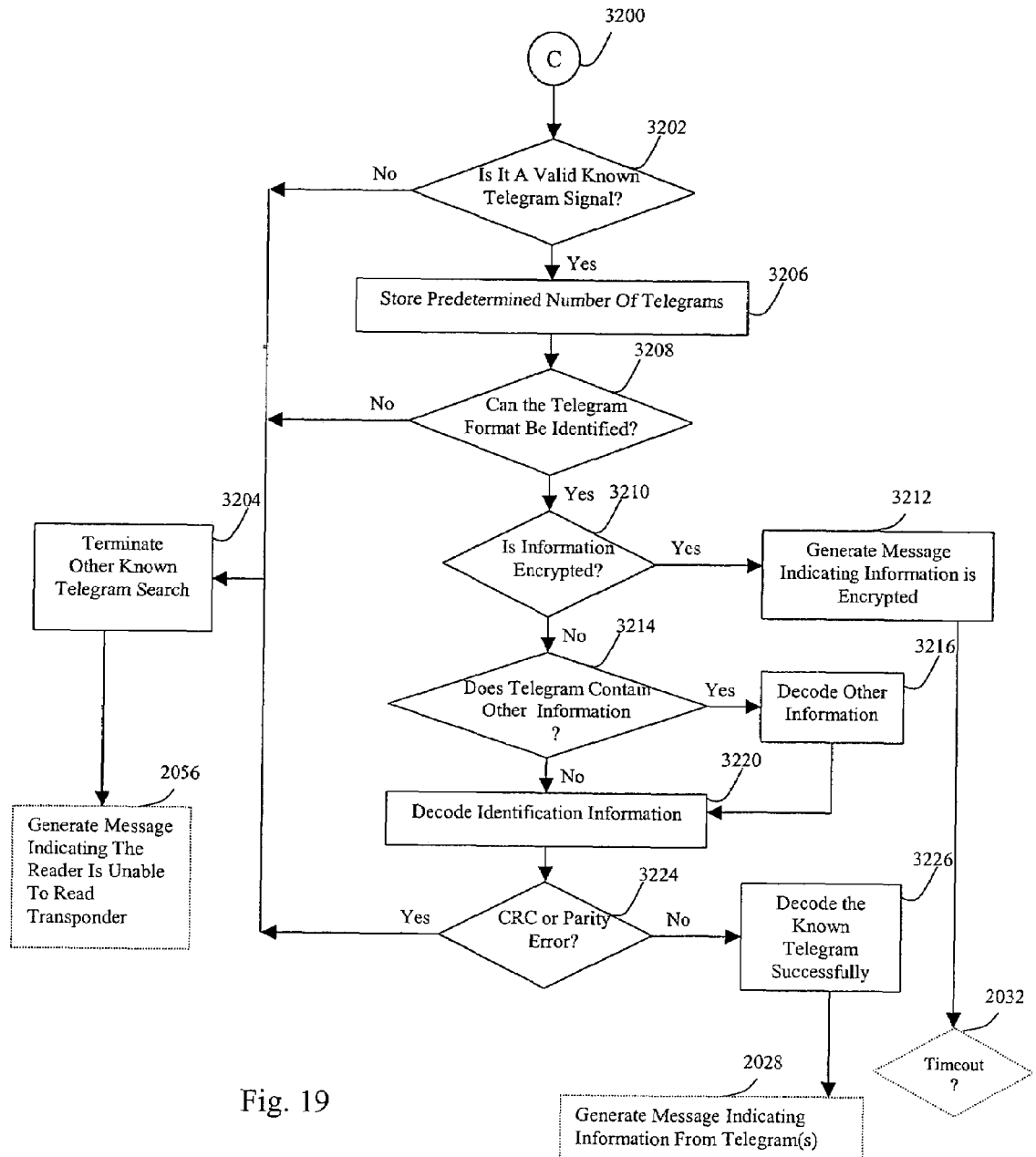
FIG. 19 is a flow chart illustration of the operational steps of an interrogator when determining the content of transmission from a transponder communicating in another known format, of one embodiment of the present invention.

Referring now to FIGS. 17-19, the operational steps for determining whether a telegram can be read are now described. In this embodiment, the interrogator seeks to determine if the signal is a valid FDXA signal. It should be understood that the interrogator can be programmed to seek any type of signal initially, and to seek other types of signals in any order. Referring first to FIG. 17, following the determination that a return telegram is received, the interrogator determines whether the signal is a valid FDXA signal at block 3000. A valid FDXA signal, in this embodiment, is an AM-FSK signal (Amplitude Modulation-Frequency Shift Keying). Two discrete frequencies are used in the FSK signal in this embodiment, namely $F_0/0=12.5$ kHz and $F_0/8=15.625$ kHz respectively, where the Fundamental Carrier Frequency $F_0=125$ kHz. The periods are $TF_0/10=1/(F_0/10)=80$ µs and $TF_0/8=1/(F_0/8)=64$ µs, respectively. The pulse widths are $½(TF_0/10)=40$ µs and $½(TF_0/8)=32$ µs respectively. In this embodiment, the interrogator determines that the signal is a valid FDXA signal if the pulse width is within the range of 32 µs to 40 µs. If the interrogator at block 3000 determines that the return signal is not a valid FDXA signal, it then terminates FDXA Telegram search, as noted at blocks 3002. The interrogator proceeds to perform the operational steps of flow chart B, as indicated at block 3100.

If the interrogator at block 3000 determines that the return signal is a valid FDXA signal, it then stores a predetermined number of telegrams transmitted by the transponder, as noted at block 3004. The transponder transmits back to back telegrams continuously while being interrogated by the interrogator. In one embodiment, the temperature sensing transponder transmits three consecutive telegrams containing identification information, followed by one telegram containing temperature information. Accordingly, for this embodiment, the interrogator would store four consecutive telegrams from the transponder. It will be understood that other combinations of temperature and identification telegrams may be transmitted by the transponder, such as one identification telegram followed by one temperature telegram. In such a case, the interrogator would store two consecutive telegrams. Furthermore, the interrogator may simply search for and store telegrams until a telegram having temperature information is received. Similarly, the interrogator may be programmed to read temperature information only, in which case the interrogator will simply search for and store a telegram which includes temperature information.

After storing the predetermined number of telegrams the interrogator, at block 3006, determines if the telegram headers are valid. As mentioned above, the transponder continuously transmits telegrams while being interrogated. The interrogator, when determining if the telegram headers are valid, stores predetermined number of binary bits received from the transponder into a bit stream buffer. As described above, in one embodiment the transponder transmits three identification telegrams and one temperature telegram. The interrogator stores the four telegrams, resulting in 384 bits (four FDXA telegrams times 96 bits per telegram) being stored into the bit stream buffer. The interrogator then analyzes the bit stream buffer to locate the header of a FDXA telegram. As described with respect to FIGS. 11 and 12, a FDXA telegram includes a header which has a predefined order and pattern of bits located in the first 16 bits of the telegram. The interrogator, after finding a bit pattern which corresponds to a header, takes the contents of the bit stream buffer and rotates them until the bit pattern containing the header is positioned at the beginning of the buffer. Thus, the predetermined number of telegrams are stored and aligned in the bit stream buffer. As will be understood, other methods of analyzing the bits received at the interrogator to determine the group of bits which correspond to a valid telegram maybe used.

The header for a telegram containing identification is predefined, in one embodiment, as 0101 0101 0001 1101 (551D), and the header for a telegram containing temperature information is predefined as 1010 1010 1110 0010 (AAE2). The header 551D is defined as the pattern for Destron (FECAVA) technology in the ISO 11785 document, Annex A, section A.2.1. The header pattern AAE2 is selected/defined for the temperature telegram for one embodiment simply as the one's compliment of the identification telegram header. As will be understood, numerous alternatives are available for temperature header pattern such as, for example: 1010 1011 1100 0010 (ABC2), 1011 1000 1010 1010 (B8AA), and 0101 0101 1110 0001 (55E1). In a preferred embodiment, the header pattern uses 16 bits and includes a Manchester Encoding violation bit pattern (111, 000, etc.) in order to make the header more easily distinguishable from the remaining portion of the telegram.

The interrogator, when determining if the telegram headers are valid, determines if the headers in each of the telegrams stored contain a header conforming to the predefined header bit patterns. If the interrogator determines at block 3006 that one or more telegram headers are not valid, it terminates FDXA telegram search as noted at block 3002. The interrogator then proceeds to perform the operational steps of flow chart B, as indicated at block 4000. If, at block 3006, the interrogator determines that the telegram headers are valid, it is determined if at least one of the telegrams contains a header which indicates that the telegram contains information other than identification information, according to block 3008. If it is determined that at least one telegram contains other information, the interrogator, at block 3010, decodes the other information.

In the above-described temperature sensing transponder, for example, the temperature information is encoded in a temperature telegram structure illustrated in FIG. 12. The temperature telegram structure includes several data fields, including the header field (16 bits), and the temperature data and error checking field (80 bits). The temperature and error checking field is divided into five separate data blocks, including the first, third, and fifth data blocks having 16 temperature data bits, and the second and fourth data blocks containing 16 error checking bits. The interrogator decodes the temperature information from the 16 temperature data bits. It will be understood that this telegram structure is one of many structures which may be employed to communicate temperature, or other information. Other structures may include, for example: the temperature and error checking field divided into five separate data blocks, including the first, second, third, and fourth data blocks having 16 temperature data bits, and the fifth data block containing 16 error checking bits; the temperature and error checking field divided into five separate data blocks, including the first data block having 16 temperature data bits, the second data block containing 16 error checking bits, and the remaining third, fourth and fifth data blocks having 16 stuffing data bits which have no special function.

If, at block 3008, the interrogator determines that none of the headers indicate the telegram contains information which is not identification information, or following the decoding of other information at block 3010, the interrogator proceeds to decode the identification information as noted by block 3020. As described above, the FDXA telegram containing identification information has an identification code field with five data blocks. The first data block contains parity data (two binary bits) and a first portion of identification data (the first 14 identification bits). The second data block contains parity data (two binary bits) and a second portion of identification data (identification bits 15 through 28). The third data block contains parity data (two binary bits) and a third portion of identification data (identification bits 29 through 42). The fourth data block contains parity data (two binary bits) and a fourth portion of identification data (identification bits 43 through 56). The fifth data block contains parity data (two binary bits) and a fifth portion of identification data (identification bits 57 through 70). The interrogator decodes the identification information from the 70 identification data bits from the five data fields.

At block 3022, a Manchester decoding error check is performed. As described above, in one embodiment the FDXA telegram information field contains five data blocks which include 80 Manchester encoded bits. The interrogator determines, at block 3022, if there was a Manchester decoding error when it converts the 80 encoded binary bits back to the 40 decoded data bits (for example, "01" is converted to "0", and "10" is converted to "1"). If a Manchester decoding error is detected, the interrogator terminates FDXA Telegram search, as noted at blocks 3002, and proceeds to perform the operational steps of flow chart B, as indicated at block 3100.

If, at block 3022, the interrogator determines that there was no Manchester decoding error, the integrator performs a CRC and parity check at block 3024. As described above, in one embodiment the FDXA telegram information field contains five data blocks which include data and parity information. The interrogator determines, at block 3024, if there was a parity error or a CRC error. If a parity or a CRC error is detected, the interrogator terminates FDXA Telegram search, as noted at blocks 3002, and proceeds to perform the operational steps of flow chart B, as indicated at block 3100.

If, at block 3024, the interrogator determines that there were no CRC or parity errors, the interrogator considers the FDXA telegram successfully decoded, as noted at block 3026. The interrogator then proceeds to perform the operational steps described beginning at block 2028 of FIG. 16. It will be understood that the order in which steps are performed may be different than the above-described order. Furthermore, some steps may be omitted such as, for example, when identification information only is desired, or when other information is desired.

Referring now to FIG. 18, the operational steps of flow chart B related to searching for valid FDXB Telegram, performed by an interrogator when it is determined that the return telegram is not a valid FDXA telegram, are now described. In this embodiment, the interrogator determines whether the signal is a valid FDXB signal at block 3102. A valid FDXB signal is an ASK (Amplitude Shift Keying) signal with pulse widths of 119.2 μs and 238.5 μs respectively. These pulse widths are determined from the fundamental frequency $F_0$ of 134.2 kHz for an FDXB signal. The pulse widths are $\frac{1}{2}[TF_0/32]=\frac{1}{2}[1/(F_0/32)]=119.2$ μs and $\frac{1}{2}[TF_0/64]=\frac{1}{2}[1/(F_0/64)]=238.5$ μs. The signal is thus determined to be a valid FDXB signal if the pulse width is within the range of 119 μs to 239 μs. If the interrogator at block 3102 determines that it is not a valid FDXB signal, it then terminates FDXB Telegram search as noted at block 3104. The interrogator then proceeds to perform the operational steps of flow chart C, as indicated at block 3200.

If the interrogator at block 3102 determines that it is a valid FDXB signal, it then stores a predetermined number of telegrams transmitted by the transponder, as noted at block 3104. In one embodiment, the transponder transmits consecutive telegrams containing both identification and temperature information. Accordingly, for this embodiment, the interrogator would search for and store a single telegram from the transponder. The telegrams transmitted in FDXB format, in another embodiment, include separate telegrams for identification information and other information. In such a case, the interrogator would search for and store multiple consecutive telegrams in order to capture telegrams containing all of the information transmitted by the transponder. As will be understood, the transmission sequence can vary significantly, having many possible combinations. The interrogator may search for and store appropriate the telegram(s) for the transmission sequence.

At block 3108, the interrogator determines if the telegram headers are valid. As described above with respect to FIGS. 13-14, a header is included as the first 11 bits of the FDXB ID telegram. Similarly as described above with respect to FIG. 17, the transponder continuously transmits telegrams so long as an interrogation signal is present. The interrogator stores the number of bits associated with the number of telegrams to be stored in a bit stream buffer, and analyzes the buffer to determine if a valid FDXB header is present. In one embodiment, the header for a telegram is predefined as 00,000,000,001, and the header is the same for a telegram containing only identification information and for a telegram containing identification and temperature information. The interrogator, when determining if the telegram headers are valid, determines if the headers in each of the stored telegrams contain a header conforming to the predefined header. If the interrogator determines at block 3108 that one or more telegram headers are not valid, the interrogator terminates FDXB Telegram search according to block 3104, and proceeds to perform the operational steps associated with flow chart C, at block 3200.

If, at block 3108, the interrogator determines that the headers are valid, it is determined if any of the telegrams contain other information in the trailer field, as noted at block 3110. If it is determined that the trailer contains other information, the interrogator, at block 3112, decodes the other information. In the above-described temperature sensing transponder, for example, the temperature information is encoded in an identification and temperature telegram structure illustrated in FIG. 14. The FDXB telegram structure includes several data fields, including the header (11 bits), a 72 bit identification information field containing 64 identification bits and 8 control bits, an 18 bit CRC field containing 16 CRC bits and 2 control bits, and a trailer field having 27 bits. The trailer field, in the embodiment of FIG. 14, includes temperature information. The trailer field includes a first block, a second block, and a third block, each having 9 bits. In this embodiment, the first block contains temperature information, and has 8 temperature bits, and one control bit. The second block contains 8 error checking bits, and one control bit, and the third block contains 8 trailer bits and 1 control bit. The interrogator searches for information in the trailer portion of the telegram, and if any information is present, this indicates that other information is contained in the telegram. As will be understood, there are numerous alternatives for storing other information within the trailed field of a FDXB telegram. The interrogator, for these other alternatives, searches for the appropriate information within the appropriate locations of the trailer. Furthermore, in the case where more than one FDXB telegram is used to store temperature or other information, the interrogator simply decodes the additional telegrams to determine the data included in the telegrams.

If, at block 3110, the interrogator determines that the trailer does not indicate the telegram contains information in addition to identification information, or following the decoding of other information at block 3112, the interrogator proceeds to decode the identification information as noted by block 3120. As described above, the FDXB telegram contains identification information in an identification code field, and the interrogator decodes this identification information from the identification code field. At block 3124, a CRC and parity check is performed. As described above, the FDXB telegram, in one embodiment, includes an 18 bit CRC field containing 16 CRC bits and 2 control bits. The interrogator determines if there was a parity error or a CRC error. If a parity or CRC error is detected, the interrogator terminates FDXB Telegram search at block 3104, and proceeds to perform the operational steps associated with flow chart C, at block 3200.

If, at block 3124, the interrogator determines that there were no CRC or parity errors, the interrogator considers the FDXB telegram successfully decoded, as noted at block 3126. The interrogator then proceeds to perform the operational steps described beginning at block 2028 of FIG. 16. It will be understood that the order in which steps are performed may be different than the above-described order. Furthermore, some steps may be omitted such as, for example, when identification information only is desired, or when other information is desired. The interrogator may also generate a message containing only identification information, or only other information. It will be understood that the order in which steps are performed may be different than the above-described order. Furthermore, some steps may be omitted such as, for example, when identification information only is desired, or when other information is desired.

Referring now to FIG. 19, the operational steps of flow chart C at block 3200 for searching other known telegrams are now described. The interrogator determines, at block 3202, whether the signal is a known telegram signal. A known telegram signal has a predefined (known) modulation and a predefined pulse width(s). The signal is a valid known telegram signal if its pulse width falls within the predefined range. The pulse width ranges, similarly as described above with respect to FDXA and FDXB signals, are a function of the fundamental frequency and the modulation of the signal, such as, for example, BPSK, ASK, OOK, among others. If the interrogator at block 3202 determines that it is not a valid known telegram signal, it then terminates other known telegram search at block 3204 and proceeds to perform the operational steps beginning at block 2056 of FIG. 16.

If the interrogator at block 3102 determines that the received signal is a valid known telegram signal, it then stores a predetermined number of telegrams transmitted by the transponder, as noted at block 3206. The number of telegrams stored will depend upon how information is communicated from the transponder. For example, if the transponder includes identification and other information in a predetermined format within each telegram, the interrogator needs to store only one telegram. Similarly, if the transponder includes identification information in a first telegram and other information in a second telegram, two telegrams are stored. The number of telegrams stored, as will be understood by one of skill in the art, is thus dependent upon the number of telegrams used by the transponder to communicate the information to the interrogator. Furthermore, the interrogator may store more than one telegram containing a certain type of information.

At block 3208, it is determined if the telegram format can be identified. The telegram format may be identified by comparing the particular fields within the telegram with predefined fields which identify the telegram as being in a format associated with the predefined field. For example, a telegram may include a header which has a binary code identifying the format of the telegram. Likewise, the telegram may be transmitted using a particular type of encoding and/or modulation which is used to determine the format of the telegram. If the telegram format cannot be identified at block 3208, the interrogator terminates other known telegram search at block 3204 and proceeds to block 2056 of FIG. 16.

If, at block 3208, the telegram format is identified, the interrogator determines if the information in the telegram is encrypted, as noted at block 3210. Some manufacturers of transponders encrypt information within the telegram structure with a proprietary encryption scheme, which the interrogator may not be able to decode. If the interrogator determines the information is encrypted and unable to be decoded, a message is generated indicating encrypted information, according to block 3212. Following the message indicating encrypted information, the interrogator continues to perform the operational steps associated with block 2032 as described in FIG. 16.

If at block 3210 it is determined that the information is not encrypted, or that the encrypted information can be decoded, it is determined if the telegrams contain other information, as noted at block 3214. This other information may include a number of different data, including temperature data, history data, other identification data, etc. If it is determined that the telegrams contain other information, the interrogator, at block 3216, decodes the other information. If, at block 3214, the interrogator determines that the telegrams do not contain information in addition to identification information, or following the decoding of other information at block 3216, the interrogator proceeds to decode the identification information as noted by block 3220. The interrogator decodes the identification information from the identification code field. At block 3224, a CRC and parity check is performed to determine if any CRC or parity errors are present. If a parity or CRC error is detected, the interrogator terminates the other known telegram search at block 3204 and proceeds to block 2056 of FIG. 16.

If, at block 3224, the interrogator determines that there were no CRC or parity errors, the interrogator is considered to have decoded the known telegram successfully, as noted at block 3226. The interrogator then proceeds to generate a message containing the information from the telegrams, which may include identification and other information, such as temperature information, according to block 2028 of FIG. 16. The interrogator may also generate a message containing only identification information, or only other information. It will be understood that the order in which steps are performed may be different than the above-described order. Furthermore, some steps maybe omitted such as, for example, when identification information only is desired, or when other information is desired.

In yet another embodiment, the RFID system may be used to monitor a body characteristic of a host continuously or periodically, with the data used for diagnostic purposes. For example, a temperature sensing transponder may be implanted in a host animal and used to continuously monitor subcutaneous temperature of the animal during a medical procedure, such as surgery on the animal or following the administration of drugs to the animal. Changes in subcutaneous temperature may provide an indication that the animal is responding normally or adversely to a medication, or animal body temperature during surgery has changed dramatically and risks stress to internal organs. Furthermore, post surgical monitoring can immediately detect a temperature change which may indicate early infection.

In this embodiment, an interrogator includes an antenna which maybe placed in close proximity to the transponder. In one embodiment, the antenna is incorporated into a flexible pad which may be secured to the animal over the area where the transponder has been implanted. In another embodiment, the antenna is incorporated into a surface on which the animal is placed during the medical procedure, or following the medical procedure for monitoring. In yet another embodiment, the antenna is incorporated into a kennel used to contain the animal. The interrogator continuously interrogates the transponder during a surgery or other procedure on the animal to obtain a nearly continuous monitor of the animal's subcutaneous temperature. Alternatively, the interrogator may interrogate the transponder at preset time intervals, such as multiple times per second, once every 30 seconds, once every minute, or constant monitoring for several hours or more if necessary. This information may be used to monitor the animal and determine whether to perform certain procedures. For example, if the subcutaneous temperature of the animal drops more than a set amount, medical personnel may attempt to warm the animal by placing blankets around the animal. Similarly, if the temperature increases more than a set amount, medical personnel may attempt to cool the animal, or administer appropriate drugs. In one embodiment, the interrogator is operably interconnected to a monitor which is programmed to give an alarm in the event that the subcutaneous temperature changes more than a preset amount. Such temperature, or other body characteristic monitoring with a chip and scanner is non-invasive and automatic, and does not require the animal to be handled and stressed. With chip and scanner the monitor can be set to take the animal temperature multiple times per second and constantly monitored for hours if necessary.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. An interrogation apparatus for communicating with at least one transponder, comprising:
   at least one antenna portion operable to transmit an interrogation signal to the transponder and to receive a data signal from the transponder;
   a processing portion operably interconnected to said at least one antenna portion operable to receive the data signal and to determine the presence or absence of body characteristic data within the data signal, and when the presence of body characteristic information is detected, decode the data signal to obtain at least said body characteristic information; and
   an output portion operable to output, when the presence of body characteristic information is detected, said body characteristic information;
   wherein said processing portion is operable to receive said data signal, demodulate said data signal into an information signal, and determine the contents of the information signal, wherein said processing portion is operable to identify an indicator within said information signal, and determine the presence of body characteristic information based on the indicator, and wherein said information signal contains a plurality of indicators, and said processing portion is operable to determine the presence of body characteristic information based on any detected differences between one or more of the plurality of indicators.

2. The interrogation apparatus of claim 1, wherein said processing portion is operable to obtain and store a predetermined number of indicators and other information from said information signal, and determine the presence or absence of body characteristic information.

3. A method for interrogating a transponder, comprising:
   transmitting an interrogation signal;
   detecting a response signal generated from the transponder in response to said interrogation signal;
   determining a format of said response signal;
   decoding identification information encoded within said response signal;
   determining if body characteristic data is included in said response signal, comprising;
   storing at least one data telegram from said response signal; and
   determining the presence of body characteristic information based on information within said data telegram, wherein said determining the presence, of body characteristic information step includes:
   comparing headers from a plurality of data telegrams; and
   determining the presence or absence of body characteristic information within said telegrams based on differences detected between said headers; and
   when body characteristic data is included in said response signal, decoding said characteristic data.

4. An interrogation apparatus for communicating with a transponder, comprising:
   at least one antenna operable to transmit an interrogation signal to the transponder and to receive a data signal from the transponder;
   a processing portion operably interconnected to said at least one antenna operable to receive the data signal and to decode the data signal to obtain identification information contained therein, and when the data signal includes an indicator, to further decode the data signal to obtain body characteristic information contained therein, wherein said processing portion is operable to detect at least two different formats of data within said data signal and is operable to detect the presence or absence of body characteristic information within each format of data; and
   an output portion operable to output said identification information and, when said indicator is detected, output said body characteristic information.

5. The interrogation apparatus of claim 4, wherein said data formats conform to an existing standard for transmission of identification information from a transponder to an interrogator.

6. The interrogation apparatus of claim 4, wherein said data formats conform to ISO standard 11785.

7. The interrogation apparatus of claim 6, wherein said data format is FDXA.

8. The interrogation apparatus of claim 6, wherein said data format is FDXB.

* * * * *